US008070198B2

(12) United States Patent
Burke

(10) Patent No.: US 8,070,198 B2
(45) Date of Patent: Dec. 6, 2011

(54) MANUAL ARTICLE REMOVAL APPARATUS

(76) Inventor: Patrick Richard Burke, Englewood, CO (US)

( * ) Notice: Subject to any disclaimer, the term of this patent is extended or adjusted under 35 U.S.C. 154(b) by 281 days.

(21) Appl. No.: 12/263,490

(22) Filed: Nov. 2, 2008

(65) Prior Publication Data

US 2010/0109358 A1 May 6, 2010

(51) Int. Cl.
*A01B 1/22* (2006.01)
*E01H 5/02* (2006.01)

(52) U.S. Cl. .......... 294/58; 294/54.5; 294/53.5; 294/51; 37/285

(58) Field of Classification Search .................... 294/51, 294/53.5, 54.5, 58; 37/265, 284, 285; 16/112.1, 16/426
See application file for complete search history.

(56) References Cited

U.S. PATENT DOCUMENTS

| | | | | | |
|---|---|---|---|---|---|
| 813,983 | A | | 2/1906 | Luney | |
| 1,241,102 | A | * | 9/1917 | Ferger | 37/283 |
| 1,375,505 | A | * | 4/1921 | Grady | 37/284 |
| 2,388,985 | A | * | 11/1945 | Martin | 37/283 |
| 2,463,150 | A | | 3/1949 | Camp | |
| 2,811,792 | A | * | 11/1957 | Cork, Jr. | 37/284 |
| 2,826,835 | A | * | 3/1958 | O'Shea | 294/54.5 |
| 3,082,554 | A | * | 3/1963 | Steeb | 294/54.5 |
| 3,477,149 | A | * | 11/1969 | Wagner | 37/233 |
| 3,773,375 | A | * | 11/1973 | Nehls | 37/268 |
| 3,938,843 | A | | 2/1976 | Pahl | |
| 4,103,954 | A | | 8/1978 | Vaslas | |
| 4,538,847 | A | | 9/1985 | Lapshansky | |
| 4,597,204 | A | * | 7/1986 | Heiden | 37/285 |
| 4,669,206 | A | * | 6/1987 | Yost | 37/285 |
| 4,944,541 | A | | 7/1990 | Waldschmidt | |
| 5,048,883 | A | | 9/1991 | Waluk | |
| 5,054,830 | A | | 10/1991 | Nisenbaum | |
| 5,440,828 | A | | 8/1995 | Simpson | |
| 5,727,829 | A | * | 3/1998 | Bellichak | 294/51 |
| 5,829,808 | A | | 11/1998 | Colla | |
| 5,871,246 | A | * | 2/1999 | Simdom | 294/58 |
| 6,830,271 | B2 | | 12/2004 | Piscopo et al. | |
| 6,883,845 | B2 | | 4/2005 | Douziech | |
| 7,077,444 | B2 | | 7/2006 | Kaufman et al. | |
| 7,681,933 | B2 | * | 3/2010 | Chesness | 294/54.5 |

* cited by examiner

*Primary Examiner* — Dean Kramer
(74) *Attorney, Agent, or Firm* — Roger A. Jackson

(57) ABSTRACT

An article removal apparatus and method for the removal of debris from a surface by a user without physical bending, twisting, or strain. The article removal apparatus includes a blade, a structure for pivotal movement, a primary extension, and a secondary extension. The blade includes a first side, a second side, and a lengthwise axis. The structure for pivotal movement includes a pivotal axis adjacent to the second side. The primary extension includes a primary longitudinal axis, a proximal end portion, and a distal end portion. The proximal end portion is adjacent to the second side. The secondary extension includes a secondary longitudinal axis, a pivotal end portion, and an opposing end portion. The pivotal end portion is adjacent to the structure for pivotal movement. A user grasps the primary and secondary extensions, one in each hand selecting the angle between them and plows the debris from the surface.

15 Claims, 22 Drawing Sheets

MANUAL ARTICLE REMOVAL APPARATUS

TECHNICAL FIELD

The present invention generally relates to a manual apparatus for removing snow, debris, or other material without forcing the user into uncomfortable or ergonometrically inefficient working positions. More particularly, the present invention is a manual article removal apparatus that is adapted to facilitate a user in the removal of snow or other material in comparison with that of traditional manual article removal apparatus. The present invention further allows the individual to remove snow and other material without placing undue twisting and stress upon the individual's back and body.

BACKGROUND OF INVENTION

The conventional form of a shovel includes an elongated shaft having a hand grip portion at one end and a shovel blade at the opposite end. In order to utilize a conventional shovel, an individual grasps an intermediate portion of the shaft with one hand and the hand grip portion of the shovel with the other hand. This forces the individual to bend over and twist their torso at an uncomfortable position while gathering snow, dirt, debris, etc., onto the face of the blade. The individual then lifts the shovel at the hand grip on the intermediate portion of the shaft using the opposite hand grip near the end of the shaft as a pivot. Along with lifting the shovel in this manner, the individual uses their back muscles to pull the shoveled material upward, adjusting their body into a standing position; this creates the potential for serious back injury. The individual may then carry the shoveled material in an upright position or toss the shoveled material by using the hand grip near the end of the shaft as the pivot, the hand grip in the intermediate portion of the shaft as the throwing arm, and twisting their upper body at the waist to gain tossing or launching momentum. This method additionally results in an ergometrically inefficient and potential injury causing working position.

The present invention relates to a shovel such as that used to clear snow from a driveway or walkway. More particularly, this invention is directed to a manual shovel apparatus having two handles urged together by an elastomeric element, whereby a coaxial pivot of the handles is positioned over the centroid of force upon the shovel blade while in use. The user grasps a handle in each hand holding the handles on the outside of their waist. The user then pushes the shovel with both handles in a snowplow manner. The coaxial pivot allows the user to angle the face of the blade for pushing the shoveled material in an angled direction, as one handle is affixed to the blade and the other handle is pivotally attached to the blade. Therefore, the action integrated into the shovel is a forward-plowing action, rather than the conventional scooping-lifting-throwing action.

In looking at the prior art in this area several patents teach clearing snow from a driveway or walkway using two or more handles whereby the handles are stationary, starting with U.S. Pat. No. 7,077,444 to Kaufman et al. disclosed is a two handled shovel for clearing a surface of snow, dirt, gravel, or other debris. The shovel in Kaufman comprises a blade having a leading edge which contacts the surface, a main handle attached to the blade and an auxiliary handle pivotally attached to the blade near the leading edge. To use the Kaufman shovel, the user holds the main and auxiliary handles and pushes the shovel forward to scoop up the snow or debris. However, to dump the snow or debris collected in the blade of the Kaufman shovel, the user must pivot the blade on a point at either end of the leading edge by manipulating the main and auxiliary handles. This requires lifting and twisting and puts strain on the user's back. Moreover, because Kaufman's shovel employs the two handles in a vertical plane with one above the other, the user could be speared by either or both handles if the blade were to catch on an uneven surface or crack on a sidewalk for instance. (Column 1, lines 53-63).

Continuing in U.S. Pat. No. 4,103,954 to Vaslas disclosed is a snow shovel having a conventional main handle and a novel auxiliary handle which enable the shovel to be easily manipulated by the user without having to bend over or unduly strain the users back in the shoveling operation. The auxiliary handle of Vaslas' shovel includes a rigid cross-brace bar which is connected at one end to the auxiliary handle rods and has means at its other end for adjustably coupling it and releasably locking it to the main handle rod in a variety of different adjustment positions. While the shovel in Vaslas does lessen the strain on the user's back, the user still must twist his back to operate the shovel. Also, the single handle of Vaslas' shovel could spear the user. (Column 1, lines 58-64. Column 2, lines 26-32). Next, in U.S. Pat. No. 5,048,883 to Waluk disclosed is a snow shovel/scraper having a dual handle arrangement, where the upper ends of the handles curve at a right angle to fit into the underarm area of the user, and a crossbar mounted along the length of the rails and are turned downwardly from the rails for grasping by the hands of the user. This arrangement allows Waluk's shovel to be pushed using the shoulders and hands of the user in a vigorous pushing action. However, should Waluk's shovel catch on a crack or uneven surface, the shovel would be forced back into the user's shoulders, which could potentially cause the user to be injured. (Abstract).

Yet further, in the pivotal shovel arts, a shovel such as in U.S. Patent Application Publication Number 2007/0108783 to Petruzelli having a laterally adjustable snow shovel, U.S. Pat. No. 6,883,845 to Douziech having a pivotable second handle, and U.S. Pat. No. 3,938,843 to Pahl having pivotable fulcrum with the handle being placed under the user's arm pit acting as a lever are discussed. Starting with U.S. Patent Application Publication Number 2007/0108783 to Petruzelli disclosed is a laterally adjustable snow shovel reinforced by braces for preventing the blade from turning or wobbling when snow is shoveled. The shovel in Petruzelli includes a handle assembly being pivotally connected to a blade for pivoting between a first position at a first acute angle between the horizontal blade axis and the vertical handle axis and a second position at a second acute angle between the horizontal blade axis and the vertical handle axis. The blade of Petruzelli's shovel also has a third position at a right angle between the vertical handle axis and the horizontal blade axis. The shovel in Petruzelli includes a pivoting means for pivoting the handle assembly with respect to the blade. The pivoting means of Petruzelli's shovel includes either a bracket that pivots with respect to the blade or a bracket that is permanently attached to the blade but is also pivotally connected to the lower handle assembly. The shovel in Petruzelli does require that the user stoop at an awkward angle and twist in operating the shovel. Additionally, the single handle is capable of spearing the user. (Page 1, paragraph 10 and 12-13). Continuing, in U.S. Pat. No. 6,883,845 to Douziech discloses a two-handled snow shovel having rotatable hand grips at each handle. The shovel in Douziech comprises a shaft with a D-shaped handle with a rotating grip located at the upper end of the shaft. The grip of Douziech's shovel rotates about a rod that extends between the sides of the handle. In Douziech, the lower end of the shaft is inserted into a shaft insert sleeve attached to the rear side of the blade. Mounted near the top of the blade of Douziech's shovel on the rear side is a second handle assembly capable of pivoting forwards and backwards. While Douziech's shovel is two handled, it is still capable of spearing the user. (Column 1, lines 41-49), being much the same as Vaslas as previously described.

Looking toward U.S. Pat. No. 3,938,843 to Pahl disclosed is a manually operated snow mover comprising a curved wooden scoop, a pair of space handle arms fastened to the convex back of the scoop, a lower cutting edge and a leading circular cutting toe on the scoop, the free ends of the arms being spaced apart so the longer flat arm may be placed under a user's arm pit to act as a lever. With the other arm in Pahl having a long handle portion to form one half of a fulcrum and a cross arm with a handle portion connected across the two arms and extending over a considerable distance to be grasped by a user's hand to form the other half of the fulcrum whereby the fulcrum has a circular motion acting as a movable imaginary pivot, the center of this pivot floating up and down and side to side as the snow mover is used in a sweeping motion. The snow mover in Pahl does require the user to pull on the handles, which requires greater effort than pushing. (Column 2, claim 1).

Also, similarly looking at U.S. Pat. No. 5,440,828 to Simpson having a slidable handle within the channel over a range of angular positions, (Abstract), U.S. Pat. No. 2,463,150 to Camp having a handle held in an adjusted position by means of a clamping lever pivotally mounted upon the rear side of the blade, (Column 1, lines 25-28), U.S. Pat. No. 813,983 to Luney having a snow shovel with a pivoted blade which turns laterally to a limited extent, so that the snow may be carried up and off the blade at one side thereof and be deflected in case the blade strikes an obstruction, (Column 1, lines 13-18), and U.S. Pat. No. 5,829,808 to Colla having a single handled shovel which allows infinite adjustment side to side of the handle. **If the user of Colla's shovel wants to move snow to either the left or right side, he/she can loosen the fasteners for securing the handle in its various positions, and move the handle either to the left or the right and tighten the fasteners, which hold the handle in the new position. (Column 1, lines 30-32. Column 2, lines 13-14 and 29-34).

The prior art patents teaching of shoveling using one or more handles whereby one or more handles are stationary allowing the user to lift the shoveled material in the same tralatitious manner, whereby the user is still resorting to employing their back in a twisted orientation to shovel the snow, dirt, debris, etc. as in such patents: U.S. Pat. No. 4,944,541 to Waldschmidt, U.S. Pat. No. 6,830,271 to Piscopo et al., and U.S. Pat. No. 5,054,830 to Nisenbaum.

The prior art patents utilizing a single pivotable handled shovel allow the user to shovel in a plurality of angular positions by different means. The shovel requires the user to angle the shovel by manually detaching and reattaching the handle as seen in U.S. Pat. No. 4,538,847 to Lapshansky, by fastening means as seen in U.S. Pat. No. 2,463,150 to Camp and U.S. Pat. No. 5,829,808 to Colla, by tightening means as seen in U.S. Pat. No. 813,983 to Luney, or by bracketing or in an alternate construction, frame pivot support as seen in U.S. Pat. No. 5,440,828 to Simpson.

However, the cited prior art shovels do not teach a shovel having two or more handles urged together by an elastomeric element, whereby the coaxial pivot of the handles is positioned adjacent to the centroid of force upon the shovel. The coaxial pivot allows the user to interchange handles by passing the handles freely from one hand to the other permitting the user to change angles, without the need for detaching and reattaching, fastening, tightening, bracketing, or otherwise having to manually adjust the frame support.

Additionally, none of the aforementioned cited prior art shovels allow the user to grasp a handle in each hand, holding the handles on the outside of their waist or more particularly their torso, whereby the user pushes the shovel with both handles in a snowplow type manner. This process eliminates the conventional scooping-lifting-throwing method attributed to back injuries and also works in an ergonometrically efficient shoveling process. Accordingly, it can be appreciated that there is a continuing need for and interest in improvements to shovels, and in this respect, the present invention addresses this need and interest.

SUMMARY OF INVENTION

An article removal apparatus and method for the removal of debris from a surface by a user without physical bending, twisting, or strain on the user's body. The article removal apparatus includes a blade, a structure for pivotal movement, a primary extension, and a secondary extension. The blade includes a first side, a second side, and a lengthwise axis. The structure for pivotal movement includes a pivotal axis adjacent to the second side. The primary extension includes a primary longitudinal axis, a proximal end portion, and a distal end portion. The proximal end portion is adjacent to the second side. The secondary extension includes a secondary longitudinal axis, a pivotal end portion, and an opposing end portion. The pivotal end portion is adjacent to the structure for pivotal movement. A user grasps the primary and secondary extensions, one in each hand selecting the angle between them and plows the debris from the surface.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 7 shows a side elevation view of the article removal apparatus in the free state, being specifically the blade embodiment, the adjacent position of the proximal end portion to the second side, and the affixed position of the pivotal end portion to the second side;

FIG. 8 shows an elevation view of the article removal apparatus, being specifically the adjacent position of the proximal end portion and the affixed position of the pivotal end portion to the second side, as modified in the separated angle state;

FIG. 10 shows an elevation perspective view of the article removal apparatus, being specifically the means for urging the distal end portion toward the opposing end portion, where the means shown is a spring;

FIG. 11 shows an elevation perspective view of the article removal apparatus, being specifically the means for urging the distal end portion toward the opposing end portion, where the means shown is an elastomeric element;

REFERENCE NUMBERS IN DRAWINGS

Figure 1:
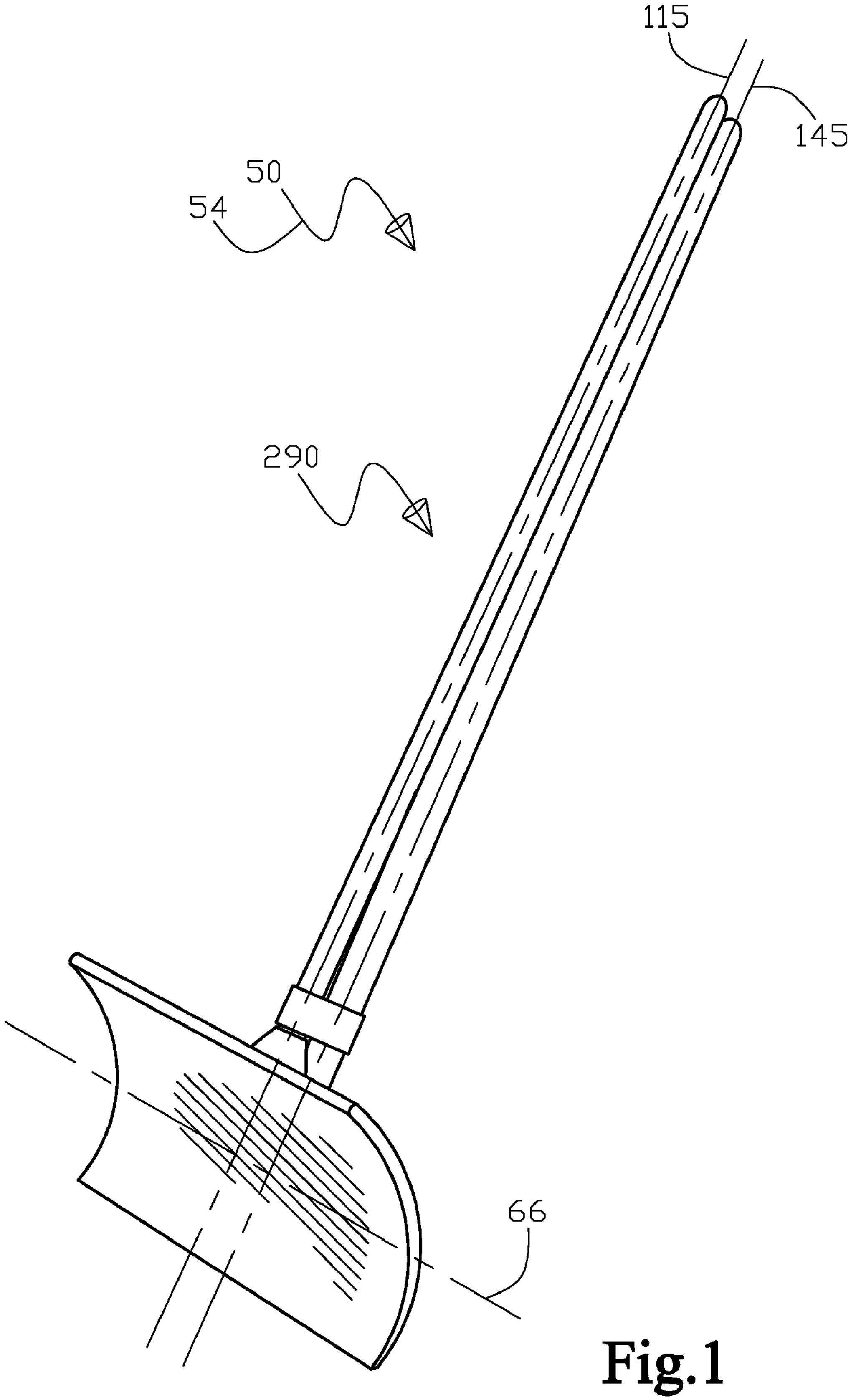
FIG. 1 shows a perspective view of the article removal apparatus, being specifically the blade embodiment in the free state.

50 Article removal apparatus
51 Article removal apparatus embodiment with a resilient portion 90
52 Article removal apparatus embodiment with a bristle portion 95
53 Article removal apparatus embodiment with a sponge portion 100
54 Article removal apparatus embodiment with a blade portion 60
55 Surface
60 Blade
65 Planar face of blade 60
66 Lengthwise axis of blade 60
70 First side of blade 60
75 Substantially concave first side 70
80 Substantially convex first side 70
85 Substantially flat first side 70
90 Resilient element extension portion of the first side 70 of the article removal apparatus embodiment 51
95 Bristle element extension portion of the first side 70 of the article removal apparatus embodiment 52
100 Sponge element extension portion of the first side 70 of the article removal apparatus embodiment 53
105 Opposing second side of blade 60
110 Primary extension
115 Primary longitudinal axis of primary extension 110
120 Proximal end portion of primary extension 110
125 Adjacent position of proximal end portion 120 to the second side 105
130 Distal end portion of primary extension 110
135 Affixed position of primary extension 110 to the second side 105 such that the primary longitudinal axis 115 is at a substantially right angle to the lengthwise axis 66
140 Secondary extension
145 Secondary longitudinal axis of secondary extension 140
150 Pivotal end portion of secondary extension 140
155 Opposing end portion of secondary extension 140
160 Sizing and configuring of primary extension 110 and secondary extension 140 to allow grasping by user 235
165 Sizing and configuring of distal end portion 130 and opposing end portion 155 to allow grasping by user 235
170 Means for urging the distal end portion 130 toward the opposing end portion 155
175 Elastomeric element for means 170
180 Spring for means 170
181 Movement of means 170
185 Means for pivotal movement
190 Pivotal axis
195 Adjacent position of pivotal axis 190 to the second side 105
200 Adjacent position of pivotal end portion 150 to the means for pivotal movement 185
205 Affixed position of pivotal end portion 150 to the second side 105
210 Arc of zero to one hundred eighty degrees originating at the pivotal axis 190

215 Arc 210 formed by the primary longitudinal axis 115 and the secondary longitudinal axis 145
220 Arc of zero to ninety degrees originating at the pivotal axis 190
225 Arc 220 formed by the primary longitudinal axis 115 and the secondary longitudinal axis 145
230 Method of employing a manual article removal apparatus 50
235 User
236 Arm of user 235
240 Hands of User 235
245 Axis of movement
250 Angle between the lengthwise axis 66 and the axis of movement 245
255 Articles, that include snow, debris, or other material
260 Grasping of primary extension 110 and secondary extension 140
265 Pivoting movement of the secondary extension 140 about the pivotal axis 190
266 Pivoting inward movement of the primary extension 110 and secondary extension 140 toward one another to the collapsed state 300 by the user 235
267 Pivoting movement of the user 235 arms 236 toward arm pivotal state 305 with the primary extension 110 extended away from the user 235 and the secondary extension 140 pulled toward the user 235
270 Moving of the blade 60 at an angle 250
271 Additional moving of the blade 60 from the pivoting inward movement 266
272 Rotational movement of the blade 60 from pivoting movement 267
275 Removal of snow, debris, or other material 255 at approximately perpendicular to the axis of movement 245
280 User 235 is disposed therebetween primary extension 110 and secondary extension 140
285 Tossing or launching movement or lifting motion of blade 60 by user 235
286 Movement of the primary extension 110 by user 235 for the tossing or launching movement 285
287 Movement of the secondary extension 140 by user 235 for the tossing or launching movement 285
290 Free state of the article removal apparatus 50
295 Separated angle state of the primary extension 110 and secondary extension 140
300 Collapsed state of the primary extension 110 and the secondary extension 140 to being nearly juxtapose
305 Arm 236 pivotal state of the user 235 to have the primary extension 110 extended away from the user 235 and the secondary extension 140 pulled toward the user 235, while the user 235 does not twist their torso

DETAILED DESCRIPTION

Figure 2:
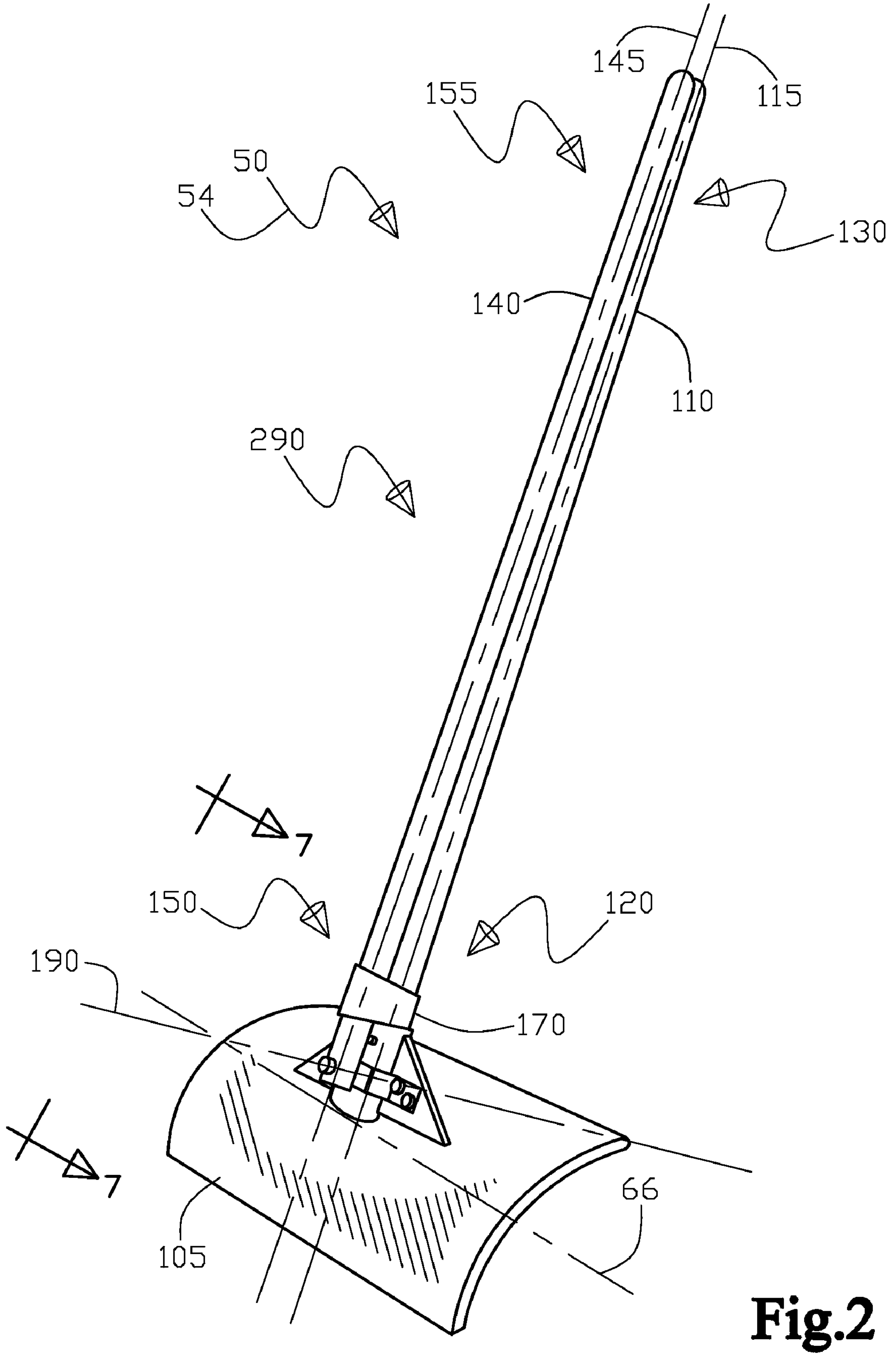
FIG. 2 shows a user side perspective view of the article removal apparatus, being specifically the blade embodiment in the free state.
Figure 3:
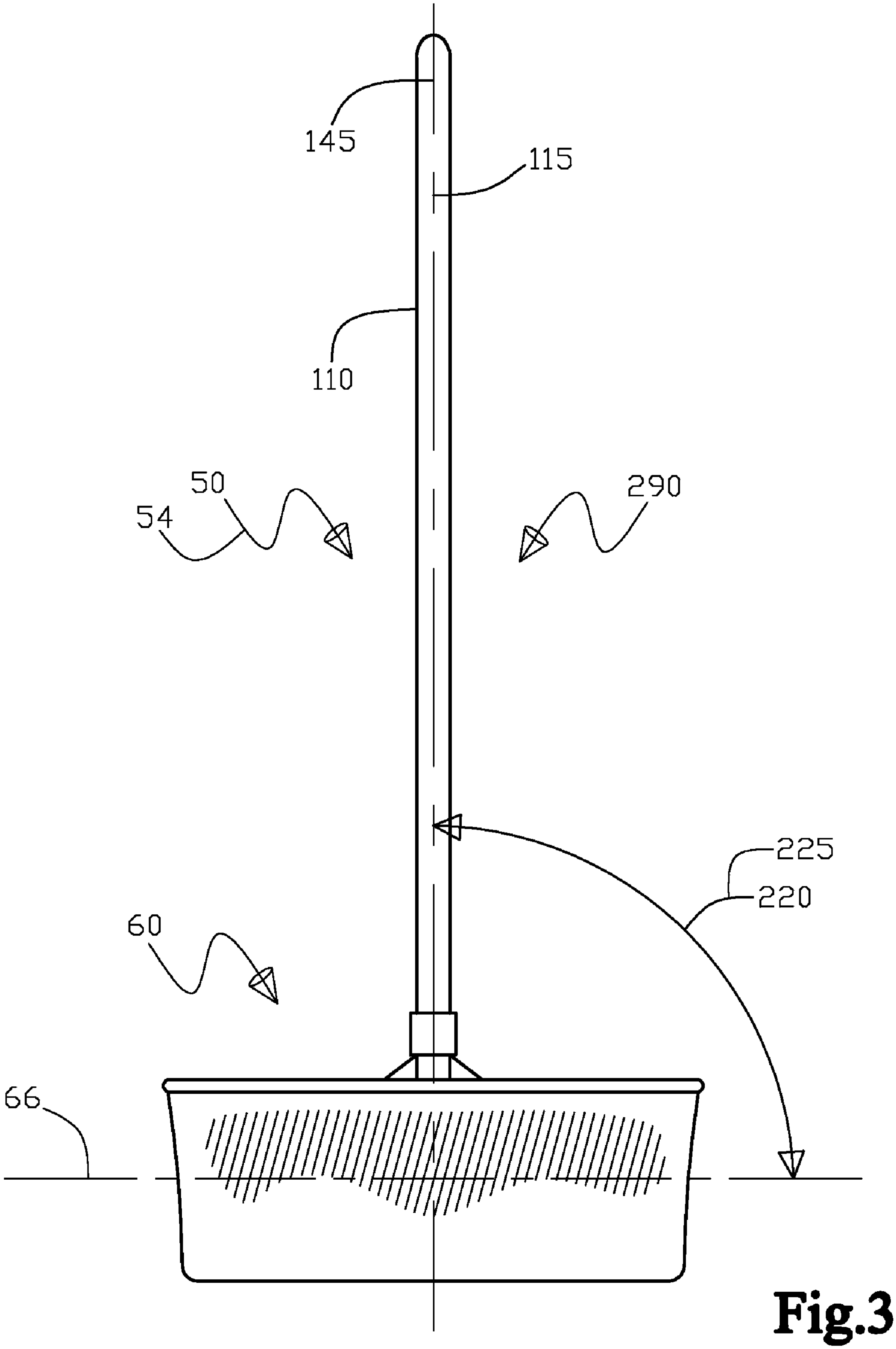
FIG. 3 shows an elevation view of the article removal apparatus, also in the free state, being specifically the arc between the primary extension and the secondary extension.
Figure 4:
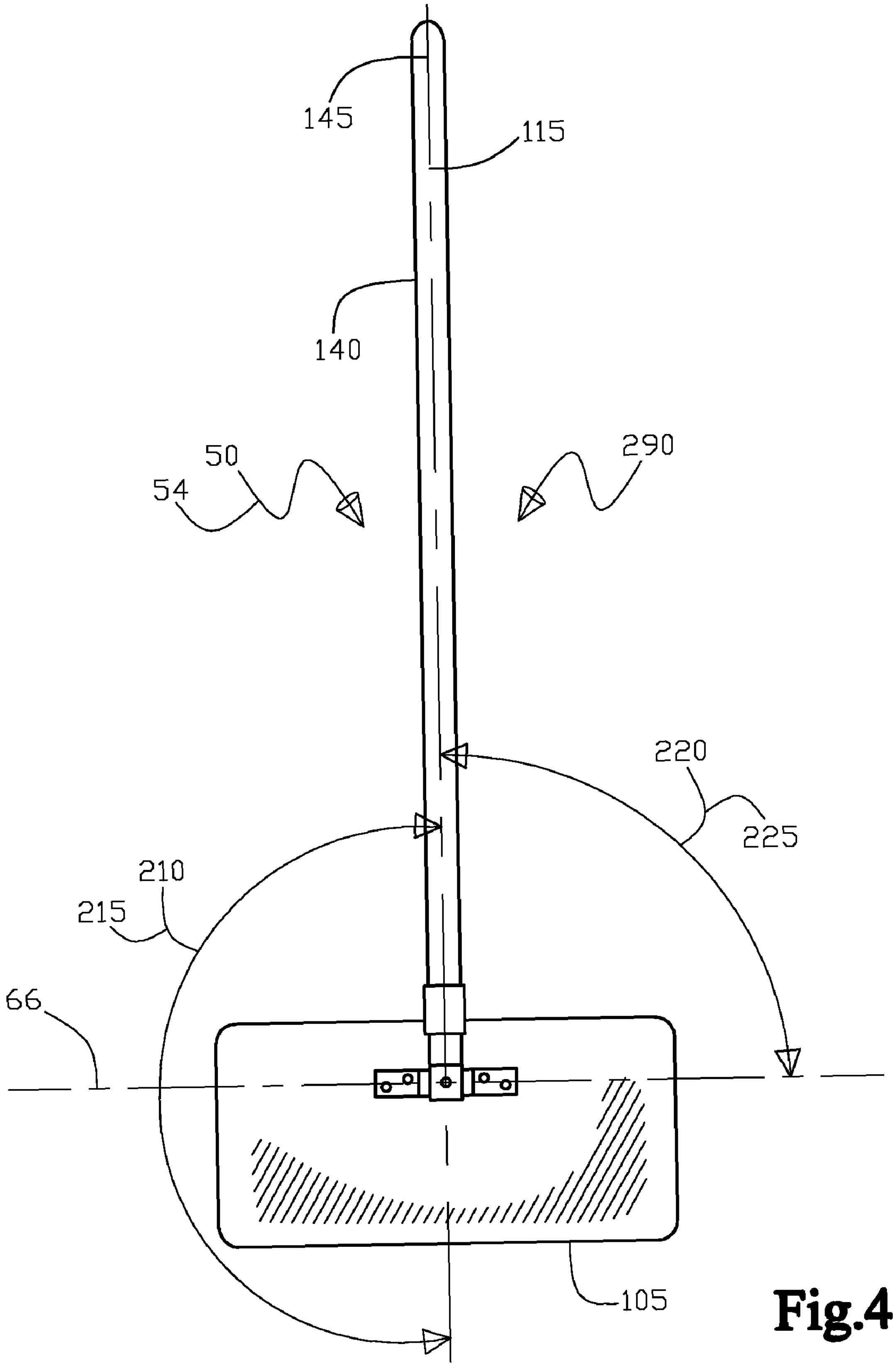
FIG. 4 shows a user side elevation view of the article removal apparatus again in the free state, being specifically the arcs between the primary extension and the secondary extension.
Figure 5:
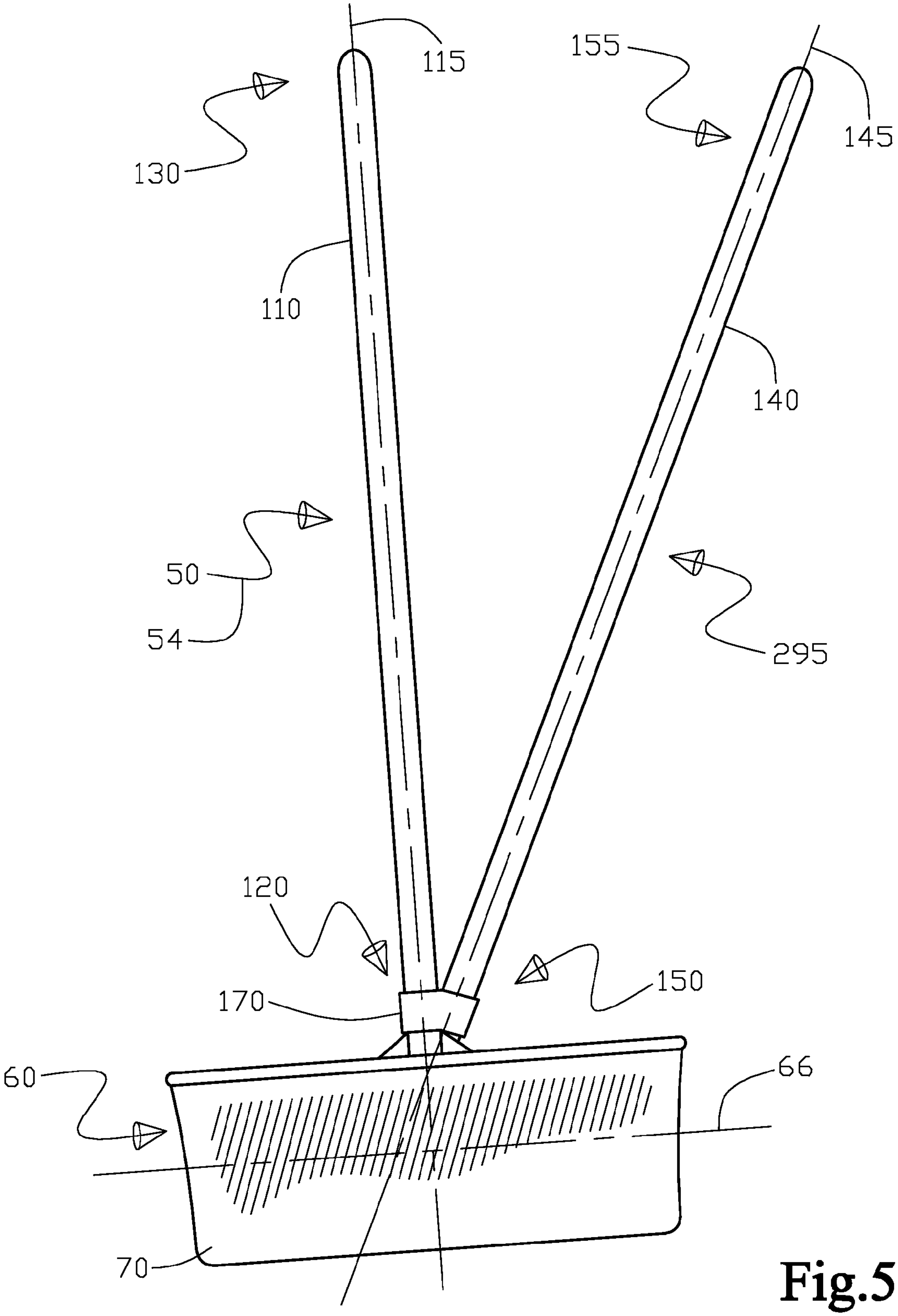
FIG. 5 shows an elevation view of the article removal apparatus, being specifically the blade embodiment in the separated angle state.
Figure 6:
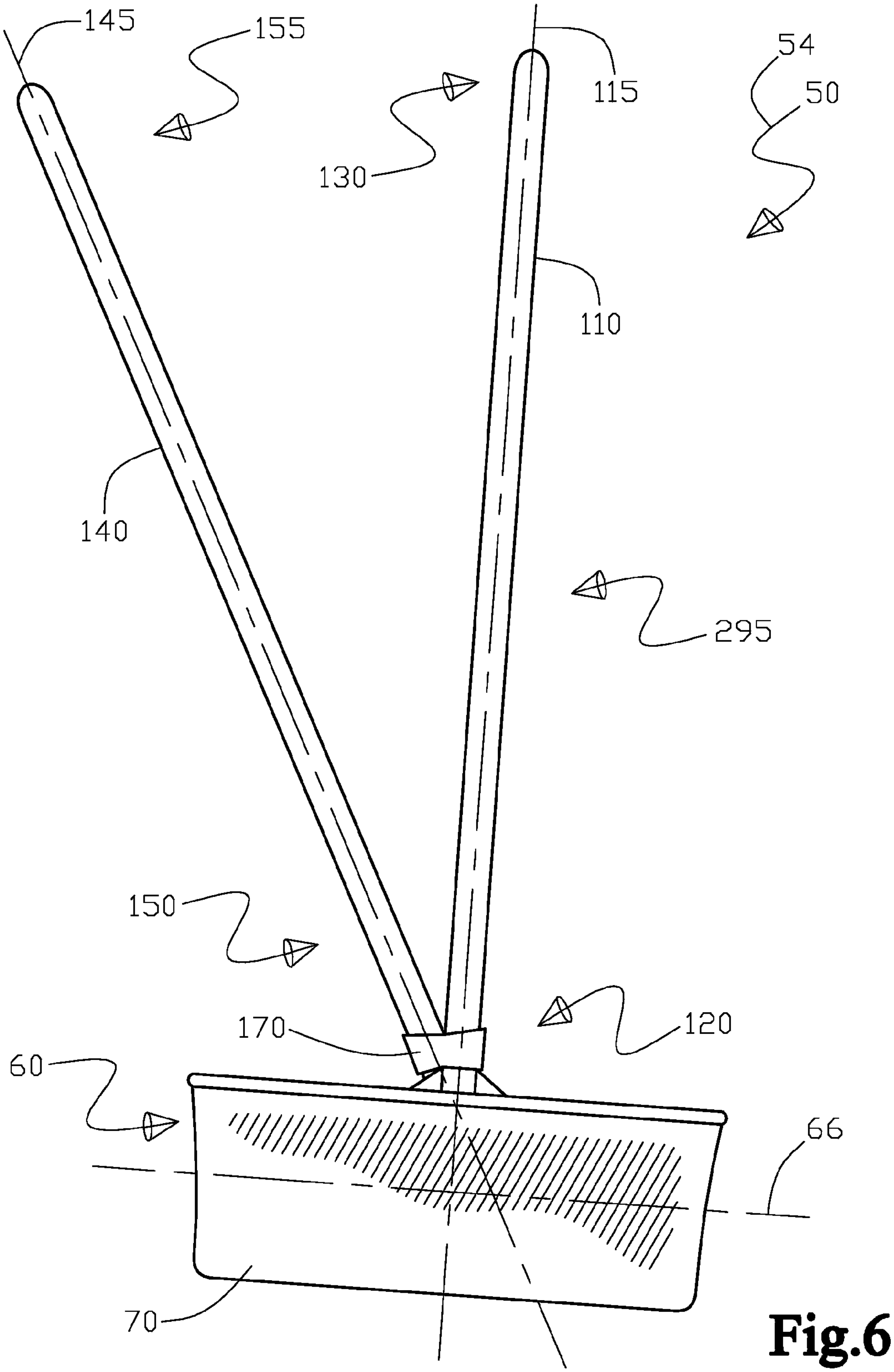
FIG. 6 shows an elevation view of the article removal apparatus, being specifically the blade embodiment in the separated angle state.

With initial reference to FIG. 1 shown is a perspective view of the article removal apparatus 50, being specifically the blade embodiment 54 in the free state 290, and FIG. 2 shows a user side perspective view of the article removal apparatus 50, being specifically the shovel embodiment 54 in the free state 290. Further, FIG. 3 shows an elevation view of the article removal apparatus 50, also in the free state 290, being specifically the arc 220 between the primary extension 110 and the secondary extension 140 and FIG. 4 shows a user side perspective view of the article removal apparatus 50 again in the free state 290, being specifically the arcs 210, 220 between the primary extension 110 and the secondary extension 140. Continuing, FIG. 5 shows an elevation view of the article removal apparatus 50, being specifically the blade embodiment 54 in the separated angle state 295 and FIG. 6 shows an elevation view of the article removal apparatus 50, being specifically the blade embodiment 54 in the separated angle state 295.

Figure 7:
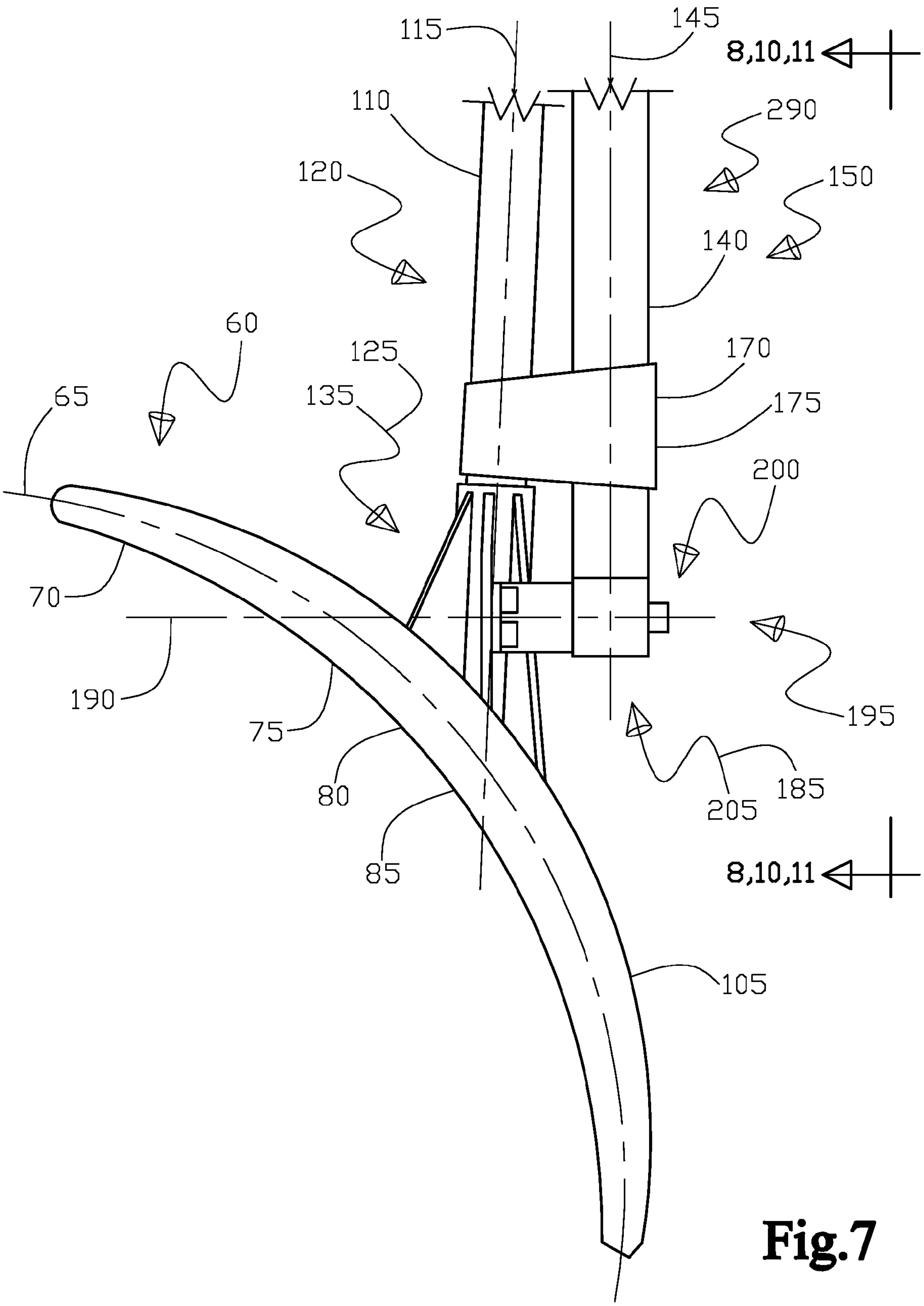
FIG. 7 shows view 7-7 from FIG. 2, thus
Figure 8:
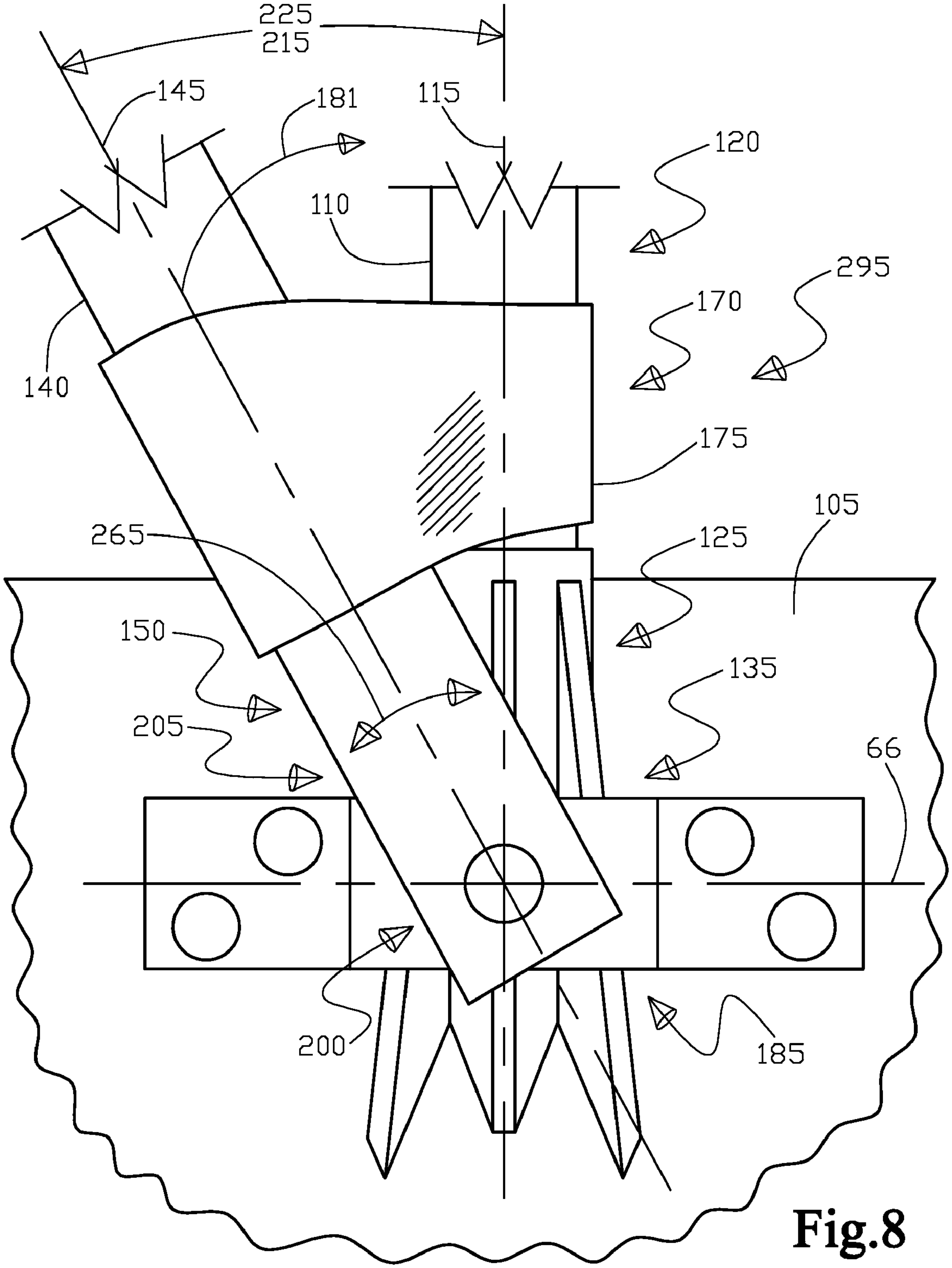
FIG. 8 shows view 8-8 from FIG. 7, thus
Figure 9:
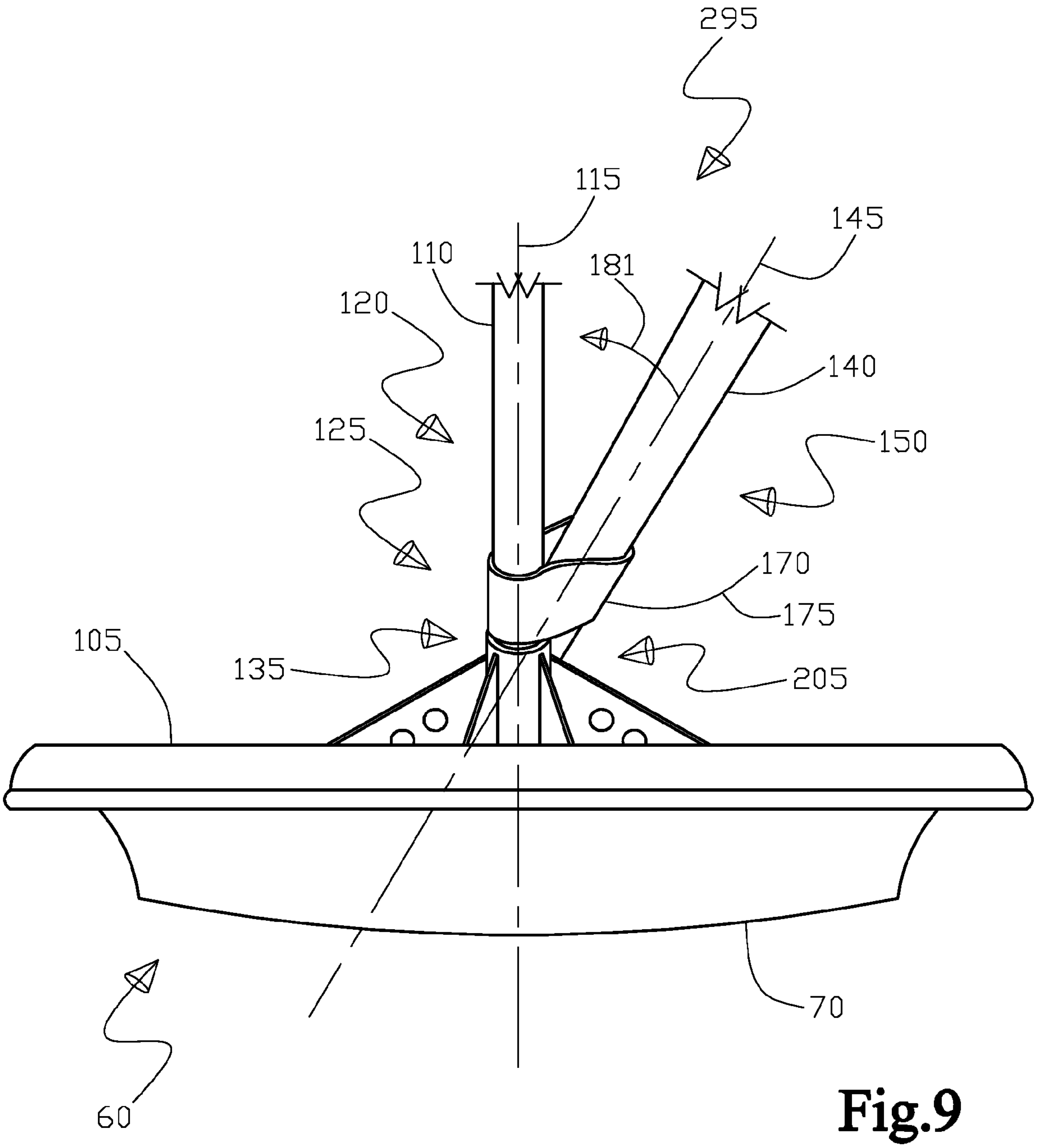
FIG. 9 shows a view from the distal portion of the primary extension of the article removal apparatus, being specifically the blade embodiment adjacent to the proximal end portion and affixed to the pivotal end portion, as shown in the separated angle state.
Figure 10:
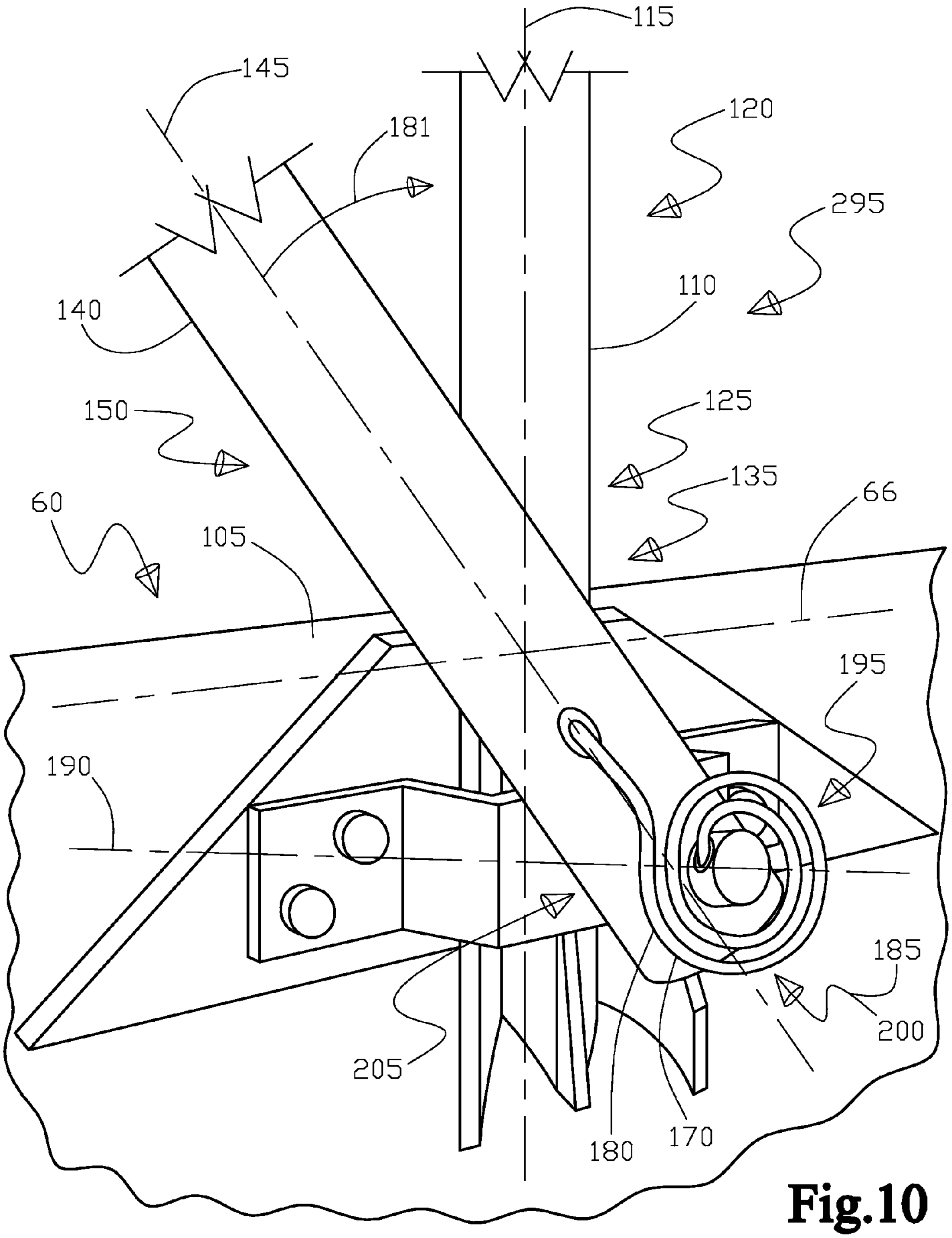
FIG. 10 shows view 10-10 from FIG. 7, thus

Next, FIG. 7 shows view 7-7 from FIG. 2, thus FIG. 7 shows a side elevation view of the article removal apparatus 50 in the free state 290, being specifically the blade embodiment 54, the adjacent position 125 of the proximal end portion 120 to the second side 105, and the affixed position 205 of the pivotal end portion 150 to the second side 105. Moving onward, FIG. 8 shows view 8-8 from FIG. 7, thus FIG. 8 shows an elevation view of the article removal apparatus 50, being specifically the adjacent position 125 of the proximal end portion 120 and the affixed position 205 of the pivotal end portion 150 to the second side 105, as modified in the separated angle state 295 and FIG. 9 shows a view from the distal portion 130 of the primary extension 110 of the article removal apparatus 50, being specifically the blade embodiment 54 adjacent to the proximal end portion 120 and affixed to the pivotal end portion 150, as shown in the separated angle state 295. Continuing, FIG. 10 shows view 10-10 from FIG. 7, thus FIG. 10 shows an elevation view of the article removal apparatus 50, being specifically the means for urging 170 the distal end portion 130 toward the opposing end portion 155, where the means 170 shown is a spring 180.

Figure 11:
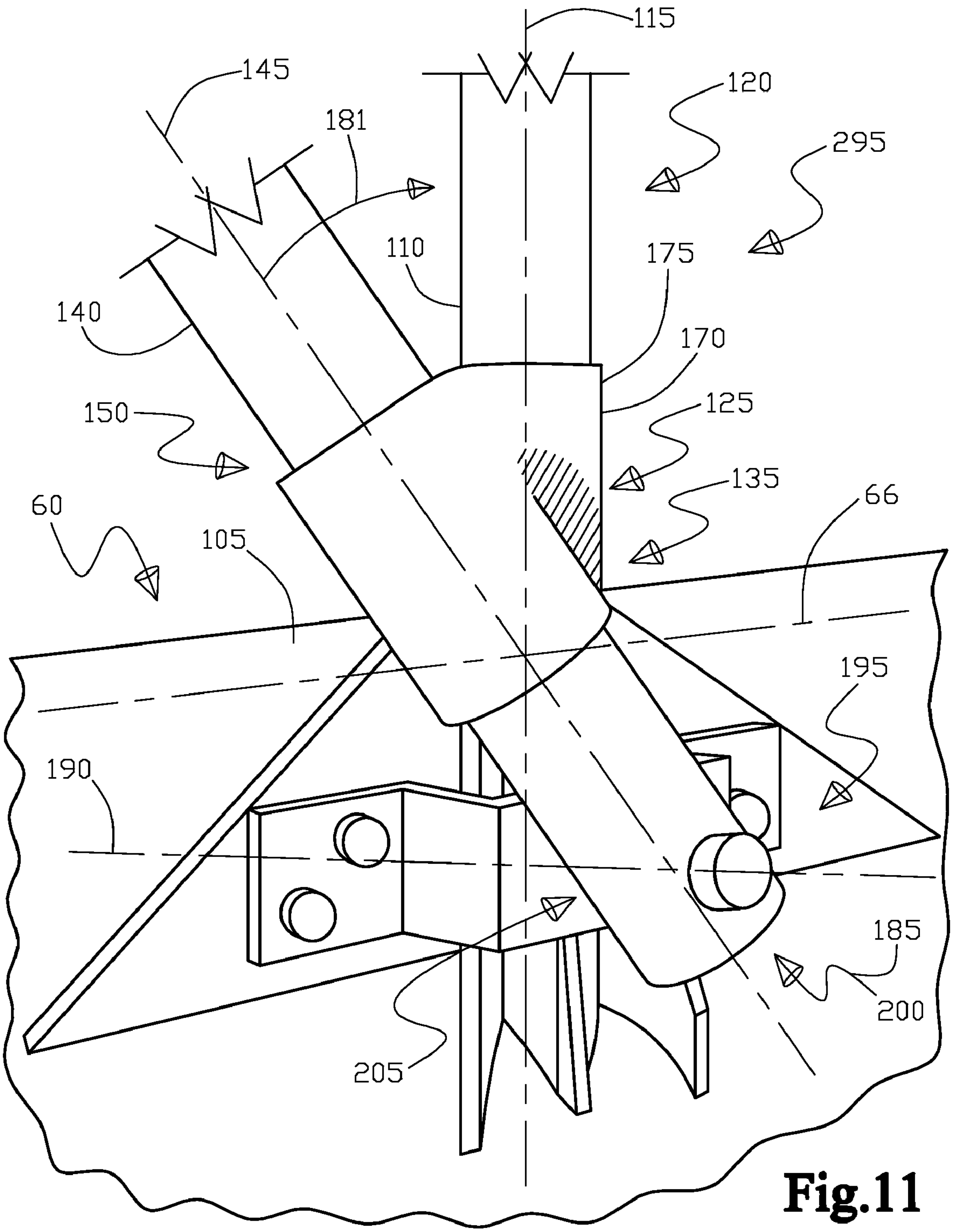
FIG. 11 shows view 11-11 from FIG. 7, thus
Figure 12:
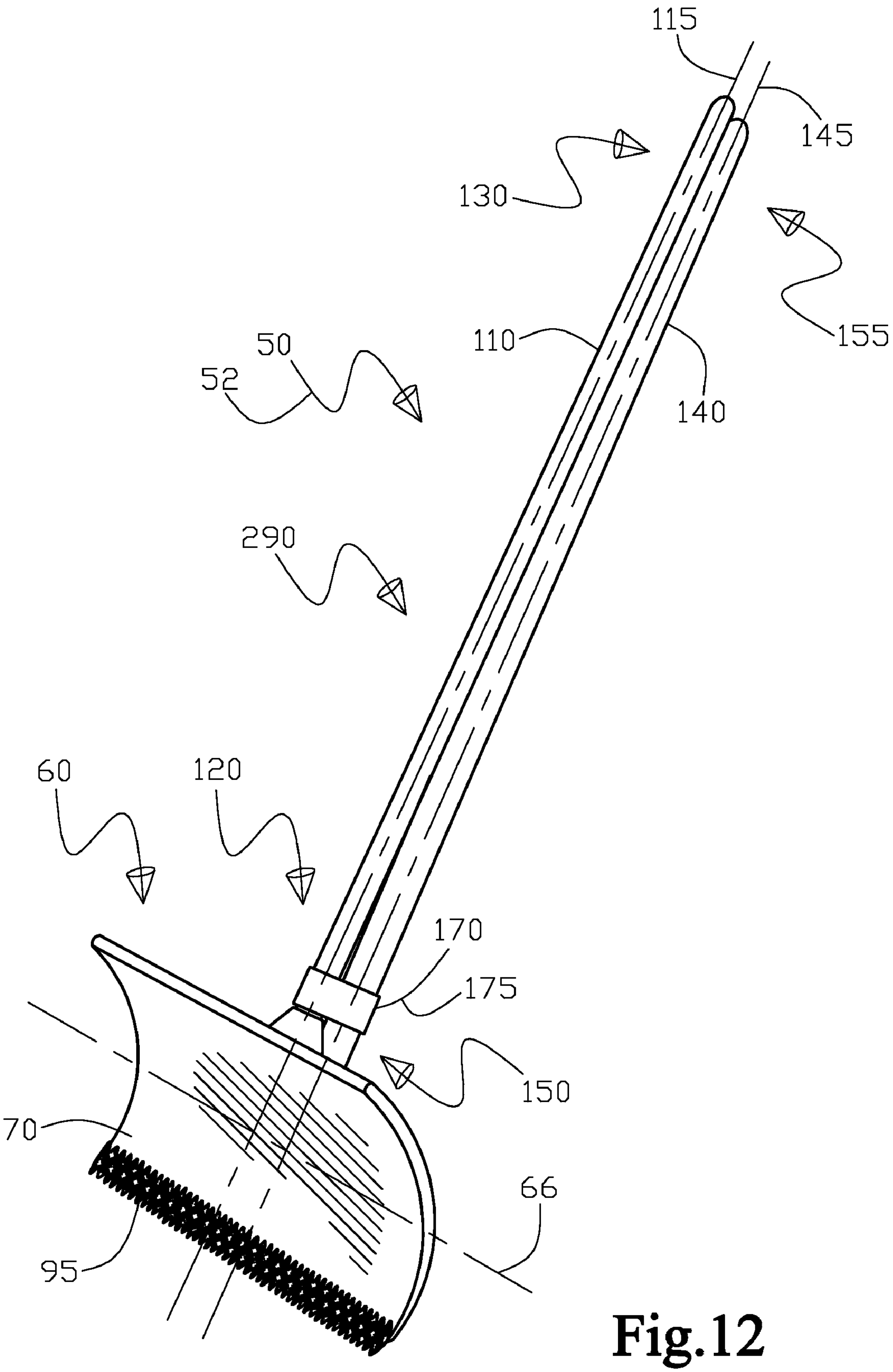
FIG. 12 shows a perspective view of the article removal apparatus, being specifically the bristle element extension portion embodiment in the free state.
Figure 13:
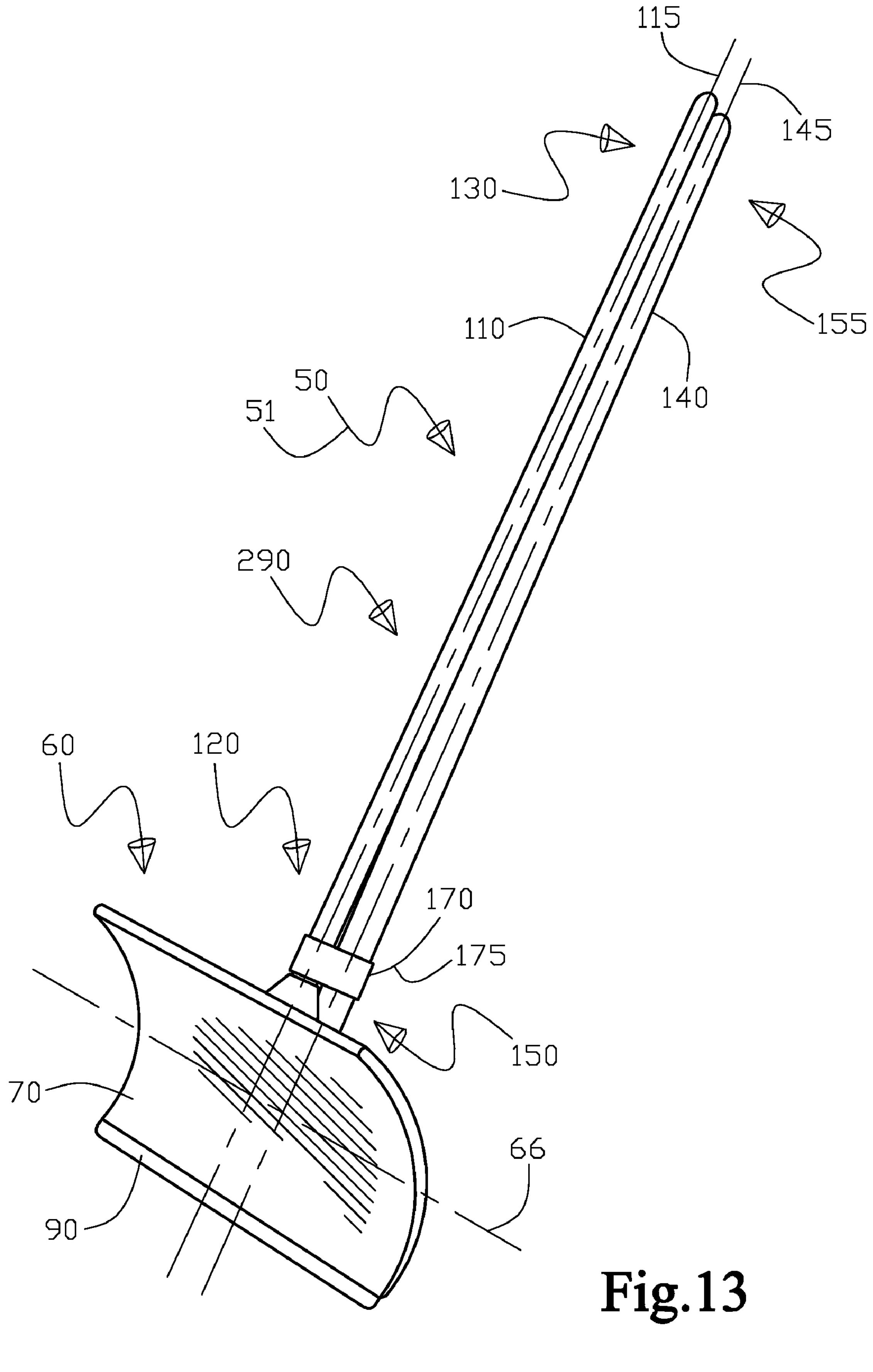
FIG. 13 shows a perspective view of the article removal apparatus, being specifically the resilient element extension portion embodiment in the free state.
Figure 14:
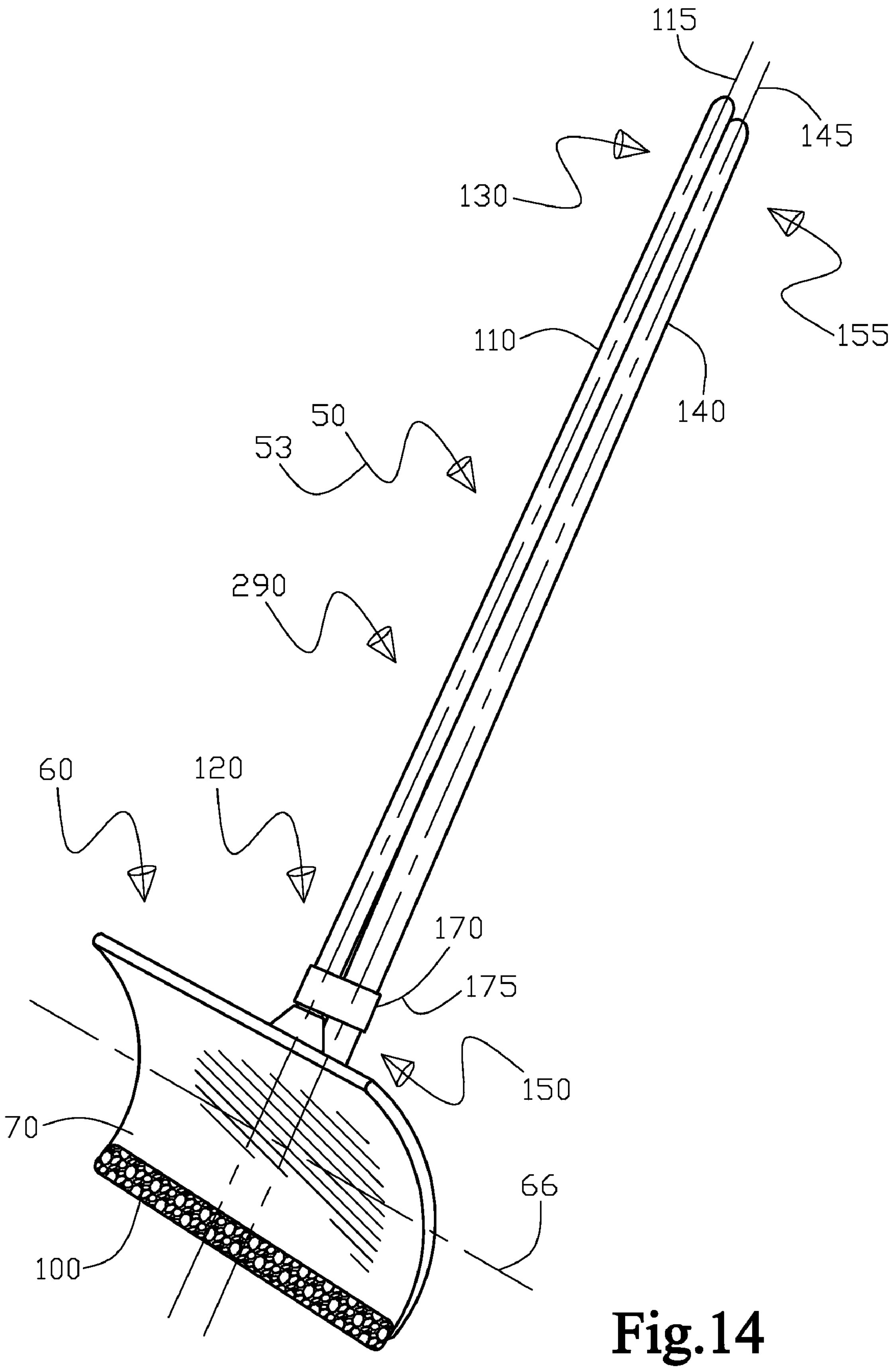
FIG. 14 shows a perspective view of the article removal apparatus, being specifically the sponge element extension portion embodiment in the free state.

Moving onward, FIG. 11 shows view 11-11 from FIG. 7, thus FIG. 11 shows an elevation view of the article removal apparatus 50, being specifically the means for urging 170 the distal end portion 130 toward the opposing end portion 155, where the means 170 shown is an elastomeric element 175 and FIG. 12 shows a perspective view of the article removal apparatus 50, being specifically the bristle element extension portion embodiment 52 in the free state 290. Further, FIG. 13 shows a perspective view of the article removal apparatus 50, being specifically the resilient element extension portion embodiment 51 in the free state 290. Next, FIG. 14 shows a perspective view of the article removal apparatus 50, being specifically the sponge element extension portion embodiment 53 in the free state 290.

Figure 15:
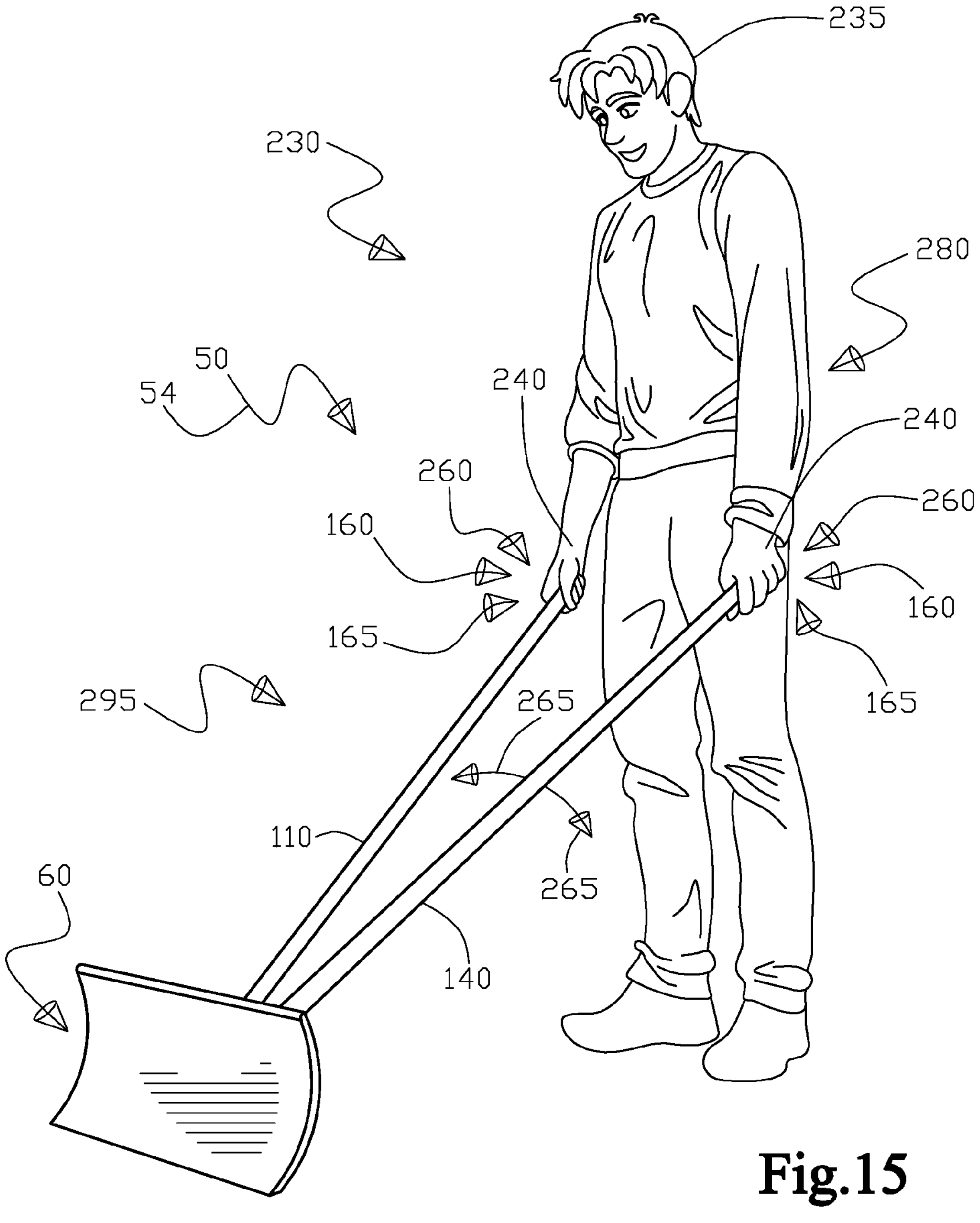
FIG. 15 shows a side elevation perspective view of the article removal apparatus in use by a user with the debris and surface not shown for pictorial clarity, being specifically the blade embodiment in the separated angle state being grasped by the user disposed therebetween the primary extension and the secondary extension.
Figure 16:
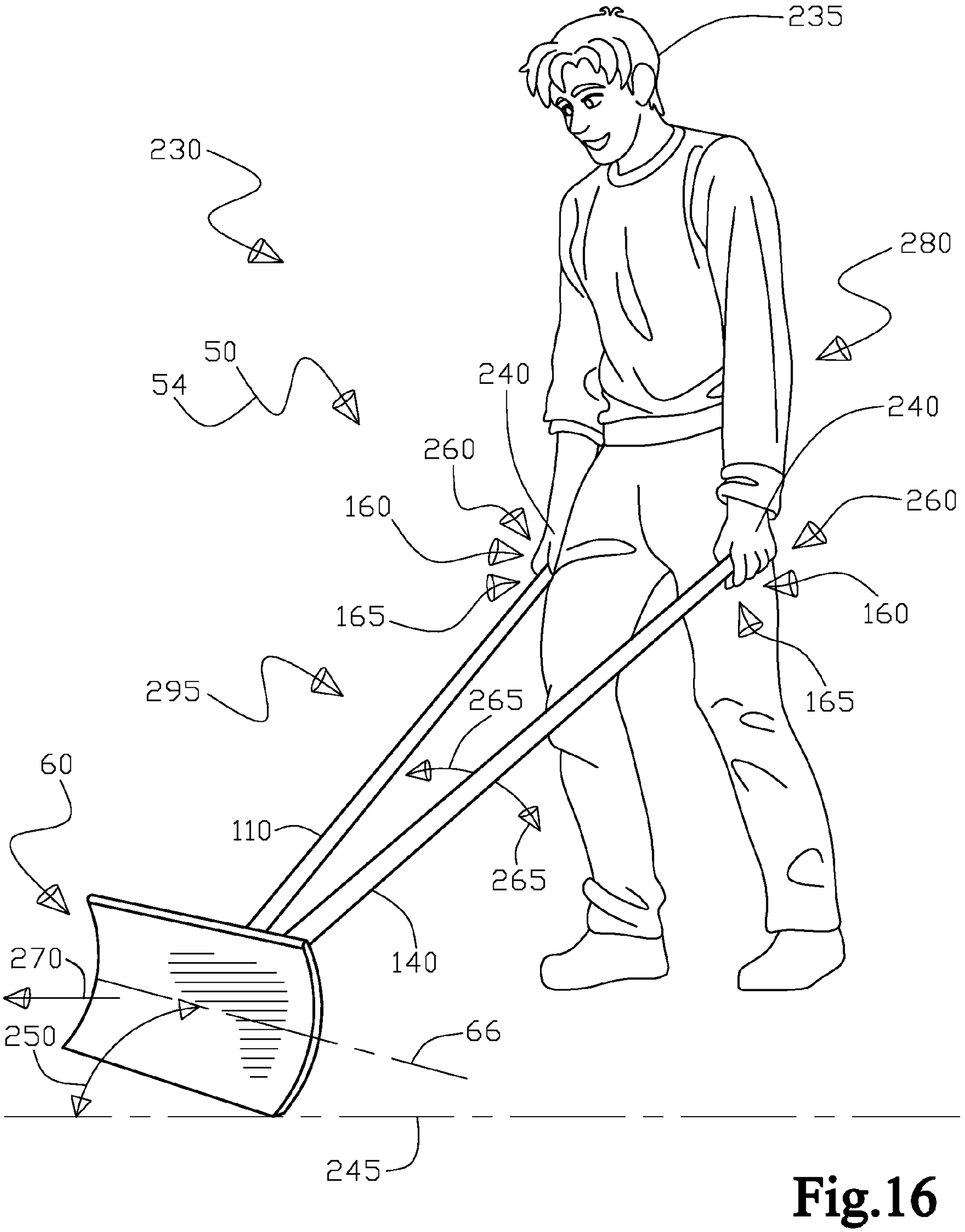
FIG. 16 shows a side elevation perspective view of the article removal apparatus in use by a user with the debris and surface not shown for pictorial clarity, being specifically the blade embodiment in the separated angle state being moved by the user at an angle between the lengthwise axis and the axis of movement.
Figure 17:
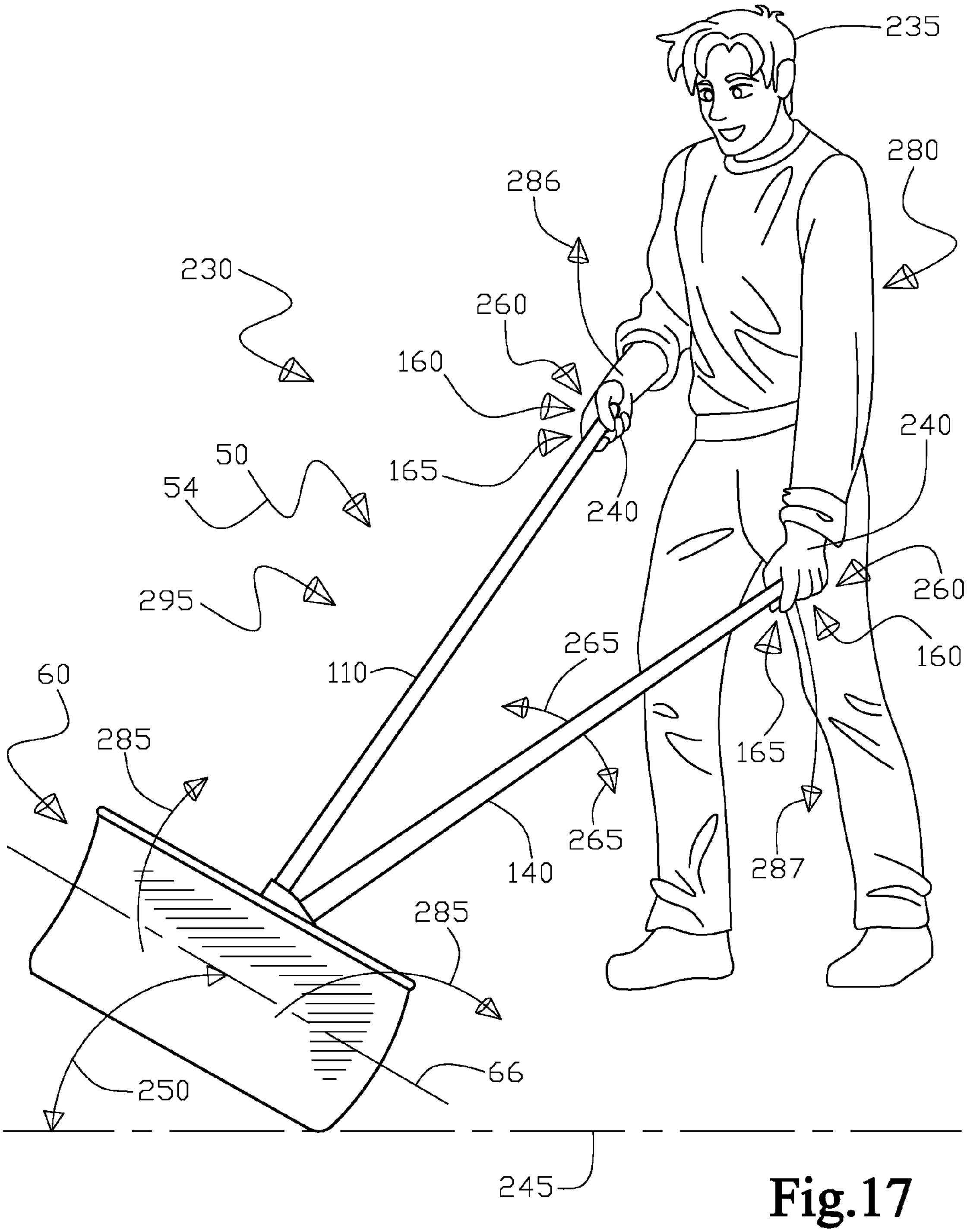
FIG. 17 shows a side elevation perspective view of the article removal apparatus in use by a user with the debris and surface not shown for pictorial clarity, being specifically the blade embodiment in the separated angle state being pivoted in a tossing or launching motion by the user.
Figure 18:
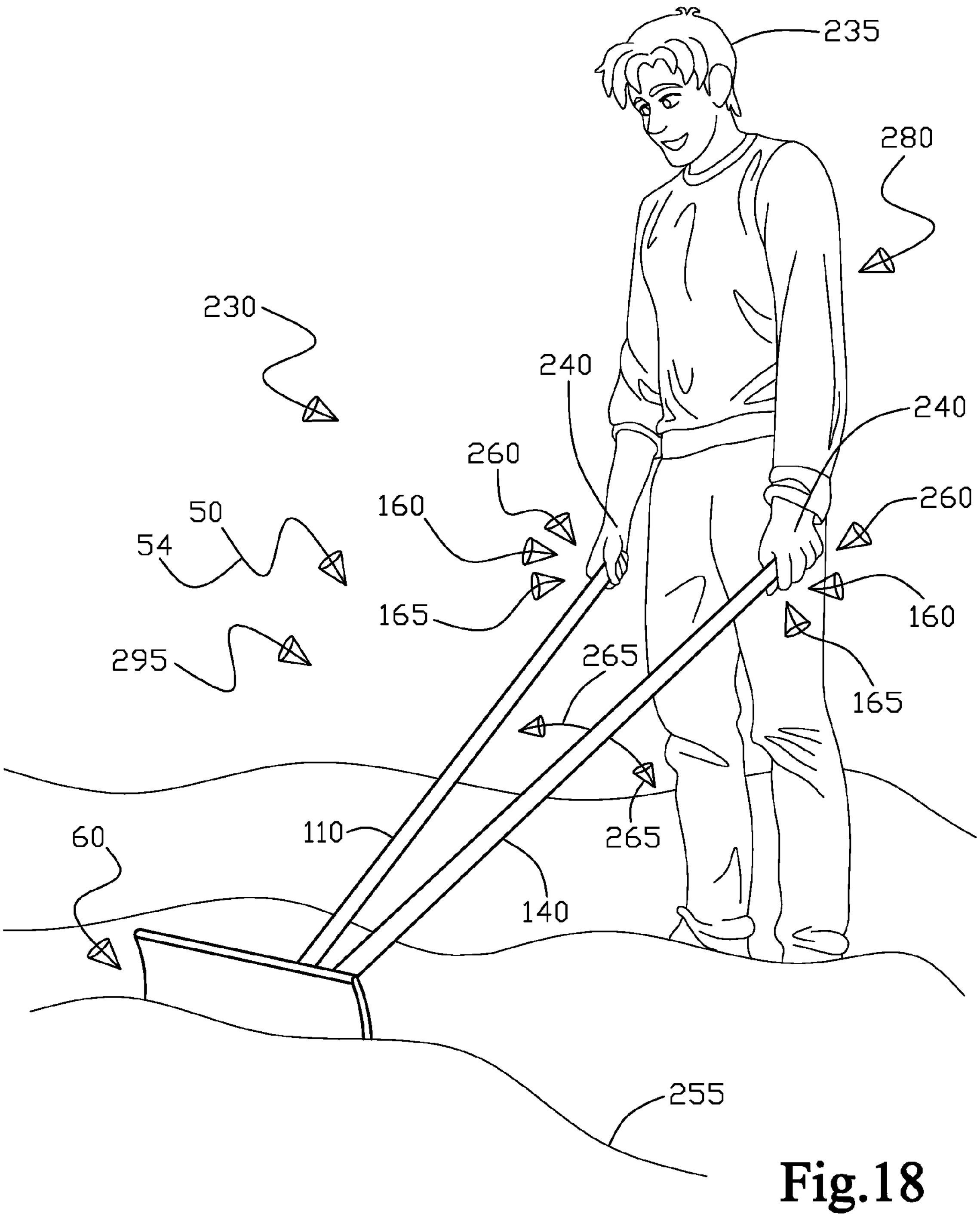
FIG. 18 shows a side elevation perspective view of the article removal apparatus in use by a user, being specifically the blade embodiment in the separated angle state being grasped by a user disposed therebetween the primary extension and the secondary extension.
Figure 19:
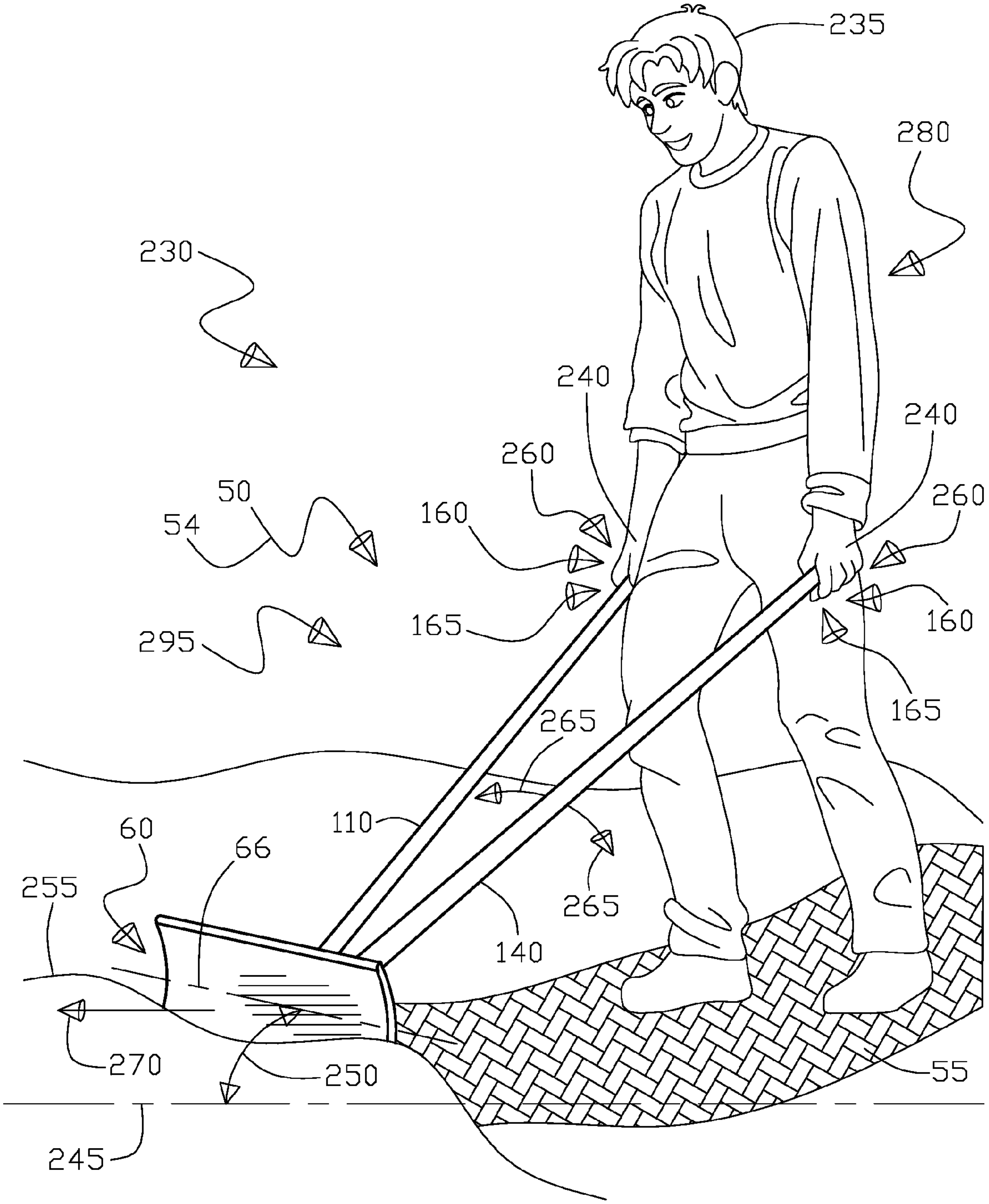
FIG. 19 shows a side elevation perspective view of the article removal apparatus in use by a user, being specifically the blade embodiment in the separated angle state being moved by a user along a surface at an angle between the lengthwise axis and the axis of movement.
Figure 20:
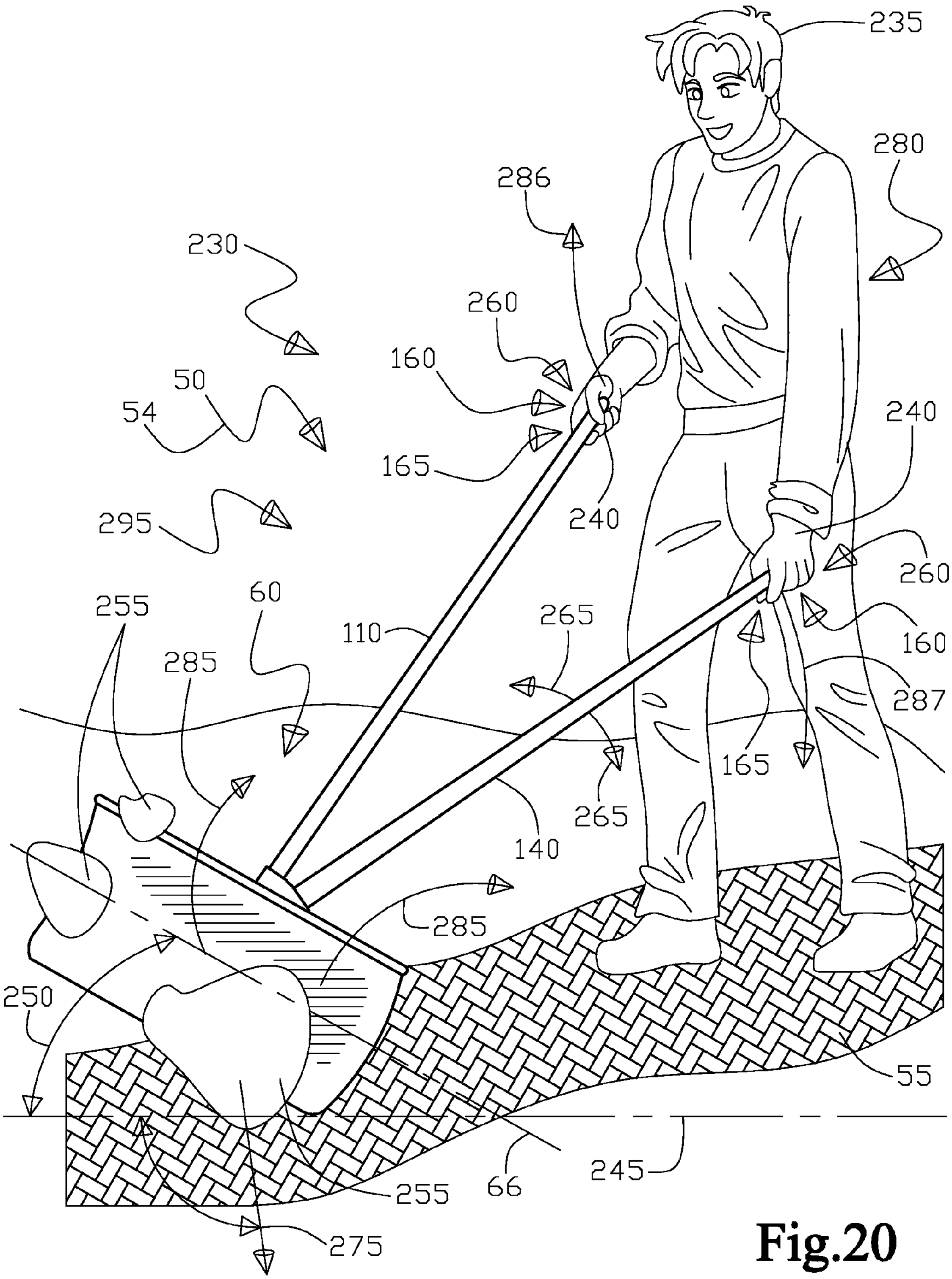
FIG. 20 shows a side elevation perspective view of the article removal apparatus in use by a user, being specifically the blade embodiment in the separated angle state being pivoted in a tossing or launching motion by the user such that snow, debris, or other material is removed from the surface at approximately perpendicular to the axis of movement.

Continuing, FIG. 15 shows a side elevation view of the article removal apparatus 50 in use by a user 235 with the debris 255 and surface 55 not shown for pictorial clarity, being specifically the blade embodiment 54 in the separated angle state 295 being grasped 260 by the user 235 disposed therebetween 280 the primary extension 110 and the secondary extension 140. Next, FIG. 16 shows a side elevation view of the article removal apparatus 50 in use by a user 235 with the debris 255 and surface 55 not shown for pictorial clarity, being specifically the blade embodiment 54 in the separated angle state 295 being moved 270 by the user 235 at an angle 250 between the lengthwise axis 66 and the axis of movement 245. Further, FIG. 17 shows a side elevation view of the article removal apparatus 50 in use by a user 235 with the debris 255 and surface 55 not shown for pictorial clarity, being specifically the blade embodiment 54 in the separated angle state 295 being pivoted 265 in a tossing or launching motion 285 by the user 235. Yet further, FIG. 18 shows a side elevation view of the article removal apparatus 50 in use by a user 235, being specifically the blade embodiment 54 in the separated angle state 295 being grasped 260 by a user 235 disposed therebetween 280 the primary extension 110 and the secondary extension 140. Next, FIG. 19 shows a side elevation view of the article removal apparatus 50 in use by a user 235, being specifically the blade embodiment 54 in the separated angle state 295 being moved 270 by a user 235 along a surface 55 at an angle 250 between the lengthwise axis 66 and the axis of movement 245. Lastly, FIG. 20 shows a side elevation view of the article removal apparatus 50 in use by a user 235, being specifically the blade embodiment 54 in the separated angle state 295 being pivoted 265 in a tossing or launching motion 285 by the user 235 such that snow, debris, or other material 255 is removed 275 from the surface 55 at approximately perpendicular to the axis of movement 245.

Figure 21:
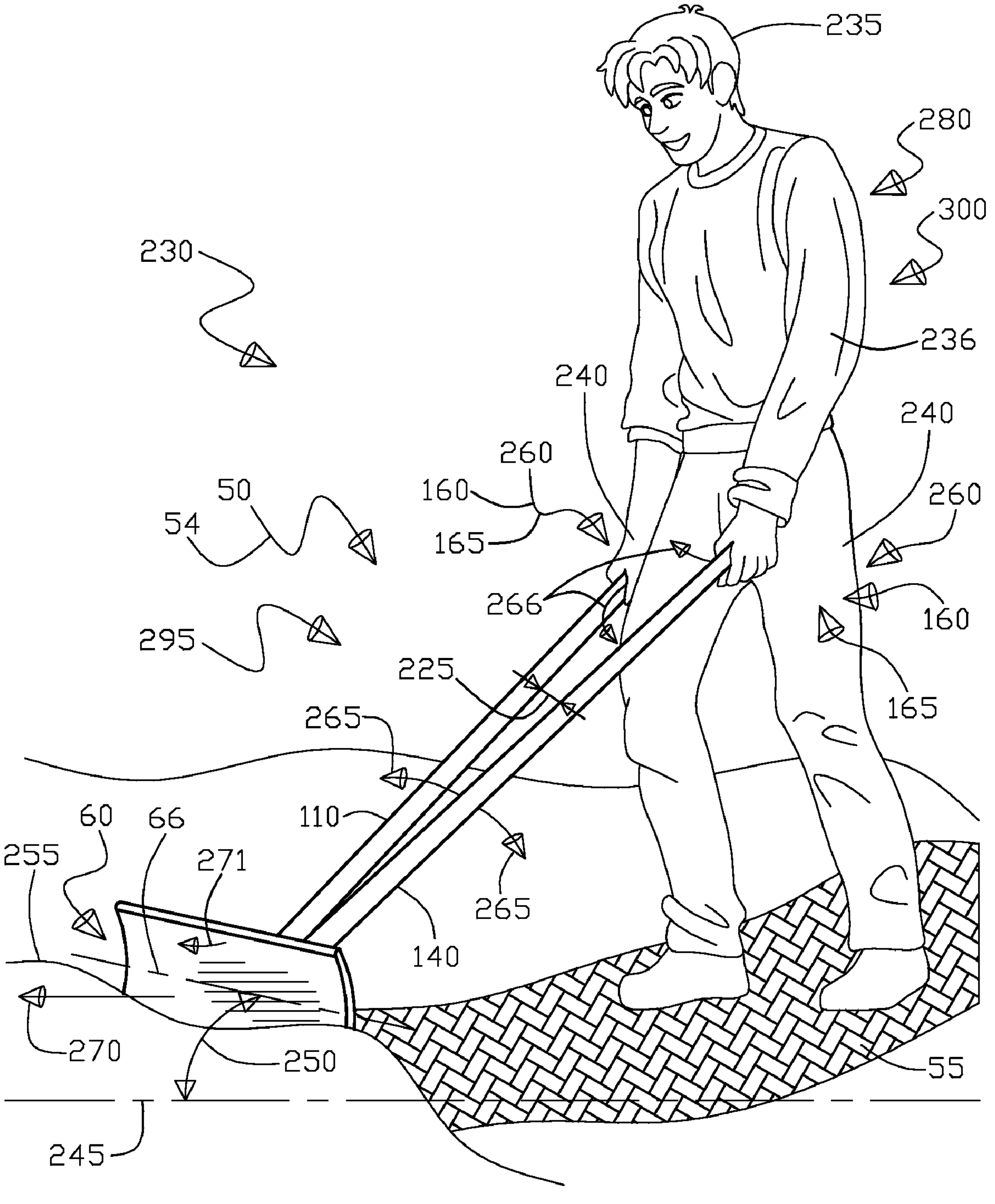
FIG. 21 shows a side elevation perspective view of the article removal apparatus in use by a user, being specifically the blade embodiment in the collapsed angle state between the primary extension and the secondary extension, wherein the blade is moved an additional amount by transitioning the primary extension and the secondary extension into the collapsed angle state by a user along a surface.
Figure 22:
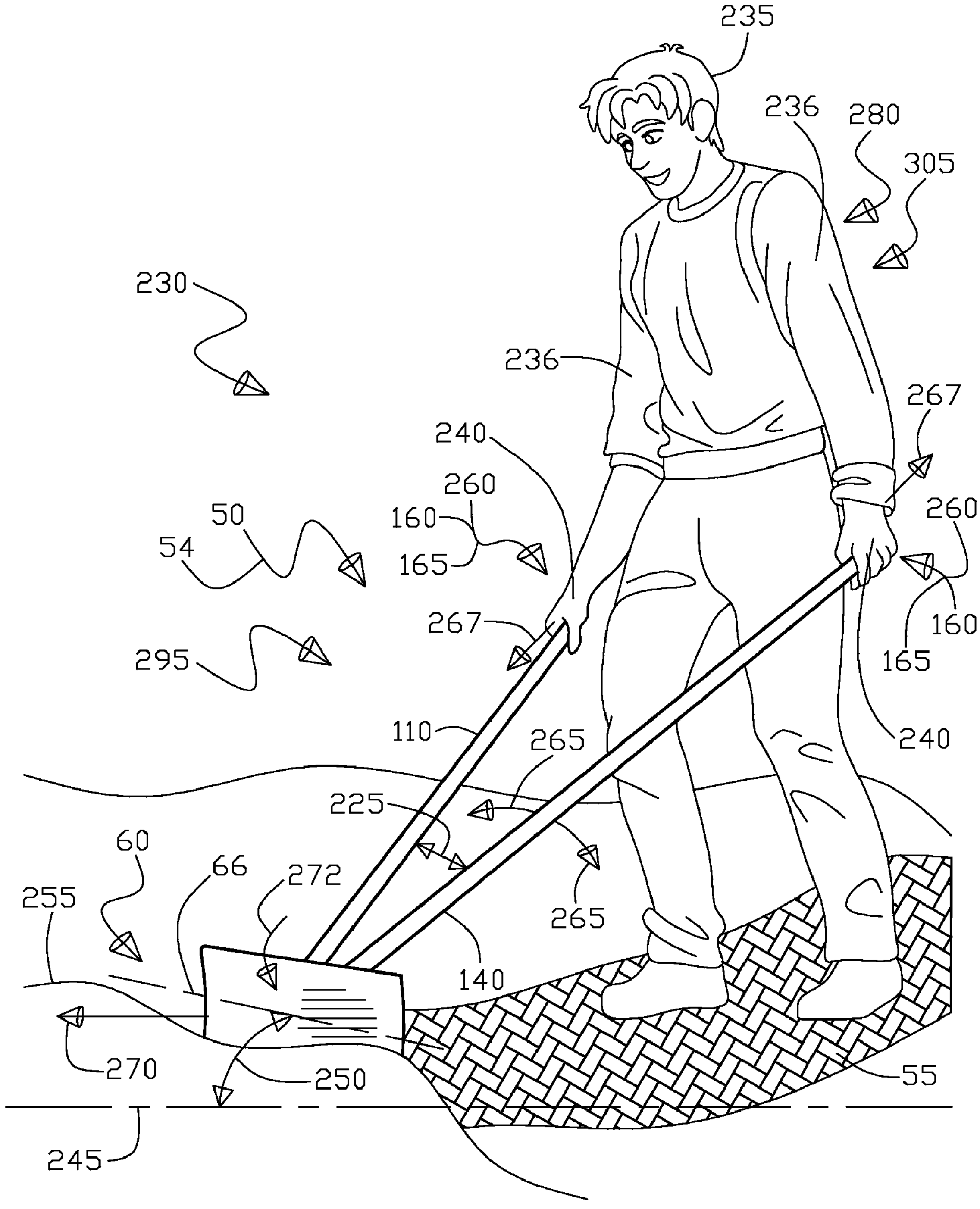
FIG. 22 shows a side elevation perspective view of the article removal apparatus in use by a user, being specifically the blade embodiment in the pivoted arm state between the primary extension and the secondary extension, wherein the blade is rotated an additional amount by moving the primary extension in the direction of the surface and the secondary extension in an opposing direction.

Next, FIG. 21 shows a side elevation perspective view of the article removal apparatus 50 in use by a user 235, being specifically the blade 60 embodiment in the collapsed arc 225 angle state 300 for movement 266 between the primary extension 110 and the secondary extension 140, wherein the blade 60 is moved 271 an additional amount by transitioning the primary extension 110 and the secondary extension 140 into the collapsed arc 225 angle state 300 by a user 235 along a surface 55. Noting that the movement 266 requires no torso twisting by the user 235, thus maintaining a stronger and less injury prone posture by the user 235. Further, FIG. 22 shows a side elevation perspective view of the article removal apparatus 50 in use by a user 235, being specifically the blade 60 embodiment in the pivoted arm state 305 between the primary extension 110 and the secondary extension 140, wherein the blade 60 is rotated 272 an additional amount by moving 267 the primary extension 110 in the direction away from the user 235 and the secondary extension 140 in an opposing direction movement 267, noting that the directional movement 267 of the primary extension 110 and the secondary extension 140 could be reversed from what is shown in FIG. 22. Noting that the movement 267 requires no torso twisting by the user 235, thus maintaining a stronger and less injury prone posture by the user 235.

Broadly, in referring to FIGS. 1 through 14, the present invention of the manual article 255 removal apparatus 50 for use on a surface 55, includes a blade 60 forming a generally planar face 65, with the blade 60 including a first side 70, an opposing second side 105, and a lengthwise axis 66, as best seen in FIG. 7. Further included is a means 185 for pivotal movement 265 along a pivotal axis 190 that is adjacent 195 to the second side 105, as best shown in FIG. 8. Also included is a primary extension 110 having a primary longitudinal axis 115, with the primary extension 110 including a proximal end portion 120 and a distal end portion 130, wherein the proximal end portion 120 is adjacent 125 to the second side 105, as best shown in FIGS. 4, 7, and 8. Further included is a secondary extension 140 having a secondary longitudinal axis 145, the secondary extension 140 including a pivotal end portion 150 and an opposing end portion 155, with the pivotal end portion 150 being adjacent 200 to the means 185 for pivotal movement 265, as best shown in FIGS. 2, 7, and 8. The materials of construction for the blade 60 are preferably a composite type of material, however, other materials would be acceptable such as steels, or any other alternate materials as long as these materials would be weatherproof and have strength adequate for a snow shovel for instance. The materials of construction for the primary extension 110 and the secondary extension 140 are preferably wood; however, also alternate materials would be acceptable again, as long as these materials would be weatherproof and have strength adequate for a snow shovel handle for instance.

Optionally, and preferably for the means 185, for the manual article 255 removal apparatus 50, the means 185 is preferably the pivotal end portion 150 being pivotally affixed 205 to the second side 105, as best shown in FIGS. 7 and 8, wherein the pivotal affixing 205 is preferably by way of a bolt and frame arrangement, wherein the bolt is rotatably attached with an aperture disposed within the pivotal end portion 150, alternatively any other method means 185 of pivotal movement affixing 205 would be acceptable as long as the function of the pivotal end portion 150 pivoting relative to the blade 60 were maintained. Also, optionally, the manual article removal apparatus 50 can further comprise a means 170 for urging the distal end portion 130 toward the opposing end portion 155, as best shown in FIGS. 7 and 8. The means 170 for urging is preferably an elastomeric element 175 as shown in FIGS. 1 through 9, wherein the elastomeric element 175 can be a band of elastic material being operable to urge the distal end portion 130 toward the opposing end portion 155, the amount of urging force need only exceed the weight of the secondary extension 140 to bring the aforementioned end portions 130 and 155 together, any type of elastic material would be suitable that is weatherproof. Other options for the means 170 for urging would include a spring 180, as shown in FIG. 10, note that the type of spring 180 could be of any spring configuration type such as helical, torsional, wavy, flat, Archimedes, or any other type that meets the previously discussed requirements. In understanding the two states for the means 170, a free state 290 is shown in FIGS. 1 through 4 to bring the aforementioned end portions 130 and 155 together, as being the default position and opposing that a separated angle state 295 as shown in FIGS. 5 and 6 for instance, requiring the user 235 to manually push apart the aforementioned end portions 130 and 155, wherein operationally the means 170 helps prevent the end portion 150 from falling to the surface 55 due to the free pivotal attachment means 185, which would allow the end portion 150 to inconveniently fall to the surface 55 inadvertently.

Returning to the primary extension 110 and the secondary extension 140 of the manual article removal apparatus 50 wherein both extensions could alternatively be 160 sized and configured 160 to be grasped 260 by a user 235, as shown in FIGS. 15 through 20, or more specifically the sizing and configuring 165 to be grasped 260 by the user 235 can be directed to the distal end portion 130 and the opposing end portion 155. This results in the primary extension 110 and the secondary extension 140 being preferably sized and configured for user 235 to ergometrically grasp 260 at the distal end portion 130 and the opposing end portion 155, however the sizing and configuring 160 for ergometric benefit the user 235 grasping 260 could by anywhere along the primary extension 110 and the secondary extension 140, and could take the form of a grooved hand grip, a pistol type grip, a flange type grip for the thumb and index finger of the user 235 to rest against, or any other ergometric design for enhanced grasping 260 by the user 235 hands 240.

Continuing with the primary extension 110 and the secondary extension 140, and focusing upon the manual removal apparatus 50 the primary extension 110 is preferably affixed 135 to the second side 105 at a positional orientation such that the primary longitudinal axis 115 is at a substantially right angle to the lengthwise axis 66 of the blade 60, as best shown in FIG. 8. This allows the primary extension 110 to selectably control the planar face 65 or lengthwise axis 66 angular 250 relationship to the axis of movement 245, as best shown in FIGS. 16, 17, 19, and 20 during use. The affixing 135 can be of any type of connection that has sufficient strength for the intended use of article 255 removal from a surface 55 by the manual removal apparatus 50, a socket and rod type is shown, see FIGS. 7 and 8, screw, bolting, adhesives, welding, integral, or any other type of connection would also be acceptable. In operation, the manual article removal apparatus 50 primary longitudinal axis 115 and the secondary longitudinal axis 145 form 215 an arc 210 to one another of about zero (0) to one-hundred eighty (180) degrees originating at the pivotal axis 190, as best shown in FIG. 4, to allow the user 235 maximum flexibility in using the apparatus 50 to remove the article 255 from the surface 55, see FIGS. 16 through 20. Furthermore, also in operation, as an additional refinement the manual article removal apparatus 50 primary longitudinal axis 115 and the secondary longitudinal axis 145 form collapsed arc 225 to an arc 220 to one another of about zero (0) to ninety (90) degrees originating at the pivotal axis 190, as best shown in FIG. 4, to allow the user 235 maximum flexibility in using the apparatus 50 to remove the article 255 from the surface 55, see FIGS. 16 through 20.

Looking at the blade 60 of the manual article removal apparatus 50 a number of options can be made for the shape of the blade 60, starting with the first side 70 being preferably substantially concave 75, as best shown in FIGS. 1, 7, and 9, however, the blade 60 first side 70 could assume a number of other shapes that are known in the art, however, not shown in the Figures, such as substantially convex 80, or substantially flat 85. Further, as an alternative embodiment 51, of the manual article removal apparatus 50, continuing on the blade 60 first side 70 could alternatively include a resilient element 90 extension portion, as best shown in FIG. 13, wherein the resilient element 90 could be an elastomeric strip similar to a squeegee or an alternative material that would function similar to a squeegee. Continuing, as another alternative embodiment 52, of the manual article removal apparatus 50, continuing on the blade 60 first side 70 could alternatively include a bristle element 95 extension portion, as best shown in FIG. 12, wherein the bristle element 95 could be a stiff short brush strip similar to a shop broom or an alternative material that would function similar to a shop broom. Yet further, as an alternative embodiment 53, of the manual article removal apparatus 50, continuing on the blade 60 first side 70 could alternatively include a sponge element 100 extension portion, as best shown in FIG. 14, wherein the sponge element 100 could be an absorbent strip similar to a floor mop or an alternative material that would function similar to a floor mop. In addition, as an alternative embodiment 54, of the manual article removal apparatus 50, continuing on the blade 60 first side 70 preferably includes a rigid edge, as best shown in FIGS. 1 through 7, wherein the blade rigid edge is adjacent to the surface 55, while in use as best shown in FIGS. 16, 17, 19, and 20.

Method of Use

Referring in particular to FIGS. 15 through 20, for the method 230 of use of the blade embodiment 54, and FIGS. 1 through 14 for the structure of the blade embodiment 54 as a reference, wherein the blade embodiment 54 being at the separated angle state 295, a method of using the article removal apparatus 50 is disclosed. The article removal apparatus 50 including the blade embodiment 54 starts with the step of firstly providing an article removal apparatus 50 that has a blade 60 forming a generally planar face 65, including a first side 70 and an opposing second side 105. Further included in the exercise apparatus is a means for pivotal movement 185 along a pivotal axis 190, being adjacent 195 to the second side 105. Also provided is a primary extension 110 having a primary longitudinal axis 115, a proximal end portion 120, and a distal end portion 130, where the proximal end portion 120 is adjacent 125 to the second side 105. Further included is a secondary extension 140 having a secondary longitudinal axis 145, a pivotal end portion 150, and an opposing end portion 155, where the pivotal end portion 150 is adjacent 200 to the means for pivotal movement 185.

Further, a next step is the user 235 grasping 260 the primary extension 110 and the secondary extension 140, as best shown in FIG. 15. Continuing, the user pivots 265 the secondary extension 140 about the pivotal axis 190, see FIGS. 15, 16, and 17. Next, a step of the user 235 moving the blade embodiment 54 such that the planar face 65 is at an angle 250 between the lengthwise axis 66 and the axis of movement 245, see FIGS. 16 through 19, where the angle 250 is formed and controlled by selectably adjusting the pivoting step 265, thereby snow, debris or other material 255 is removed 275 from the surface 55 at approximately perpendicular to the axis of movement 245, as best shown in FIGS. 19 and 20.

Paying particular attention to FIGS. 15 through 20, in other words the use drawings, it can be seen that the manual article 255 removal apparatus 50 encompassing alternative embodiments 51, 52, 53, and 54 allows the user 235 to remove debris 255 from the surface 55 using the manual article 255 removal apparatus 50 by grasping 260 the primary extension 110 and the secondary extension 140 while the user's 235 body posture remains in a normal state with their back erect and their body not twisted. Compare this as opposed to a typical for instance show shoveling body posture, wherein the user would be bent over forward with their torso twisted and given the fact that the user exerts load upon their body, by firstly a forward force to push the shovel along the surface 55 and then an upward force to lift the snow/debris scooped from the surface. It is common knowledge that when as individual lifts or moves a heavier object that they are supposed to approach the object head on, on other words squarely facing the object by not bending their back or twisting their body to minimize the risk of bodily injury. However, when an individual shovels snow with a conventional snow shovel, this is exactly what they do, as they approach a load (the snow weight in the shovel) with their back bent over forward and their body twisted that acts to increase the risk of bodily injury from the snow shoveling. The present invention works toward reducing the bent over back position and the twisting of the body scenario to help prevent bodily injury. When the user 235 grasps 260 the primary extension 110 and the secondary extension 140 as best shown in FIG. 15, as the user 235 is disposed 280 between the extension 110 and 140 they are splitting the load force in a substantially symmetric manner for their arms and shoulders and they can move 265 the two extensions 110 and 140 both to a comfortable width and can set the angle 250 between the axis 66 and axis 245, see FIG. 19, via movement 181 or the means 170, see FIG. 8. Continuing, in returning to FIG. 19 for reference, the user 235 in acting somewhat in the mode of a manual snow plow moves 270 the blade 60 at an angle 250 to move the snow 255 across the surface 55, note that the user 235 has little risk from getting gored from either of the two extensions 110 or 140, if for instance the blade 60 should get caught in a crack in the surface 55 while the user 235 is moving 270 along the surface 55, wherein this "goring" would be a risk with a conventional single handle snow shovel handle that is in "line-of-sight" of the user's body while in use.

Further, on the use of the manual article removal apparatus 50, if desired the user 235 can decide whether to just plow the debris off of the side of the surface 55 (like a conventional snowplow without any lifting of the blade 60 required) or the user 235 can remove 275 the debris 255 by using lifting movement 285 as best shown in FIG. 20, noting that the user 235 is lifting in a proper mode with their torso not bent over forward or twisted to minimize potential injury. The lifting movement 285 is accomplished by movement 286 of the extension 110, and movement 287 of the secondary extension 140 as shown in FIG. 20.

Optionally, a additional step of the user 235 manually engaging in an inward pivoting movement 266 of the primary 110 and secondary 140 extensions toward one another that operationally results in the blade 60 having an additional movement 271 away from the user 235 adjacent to the surface 55 to further move the debris, snow, or other material 255 from the surface 55, in the collapsed angle state 300 of the primary 110 and secondary 140 extensions, as best shown in FIG. 21. Note, that the user 235 as shown in FIG. 21 need not twist their torso during this operation as shown in FIG. 21, thus having more strength and less chance for injury to the user 235 by keeping their torso facing the debris 255 in a normal manner, i.e. the user 235 chest front parallel to the debris 255. Also, optionally a further step of the user 235 manually engaging in an arm pivoting movement 267 to move the primary extension 110 away 267 from the user 235 and the secondary extension 140 toward 267 the user 235 that operationally results in the blade 60 having an additional rotational movement 272 in relation to the surface 55 to further move the debris 255 away from the axis of movement 245 along the surface 55 in the user 235 arm 236 pivotal arm state 305, as best shown in FIG. 22. Note, that the user 235 as shown in FIG. 22 need not twist their torso during this operation as shown in FIG. 22, thus having more strength and less chance for injury to the user 235 by keeping their torso facing the debris 255 in a normal manner, i.e. the user 235 chest front parallel to the debris 255.

Conclusion

Accordingly, the present invention of a manual article removal apparatus 50 and alternative embodiments 51, 52, 53, and 54 have been described with some degree of particularity directed to the embodiment of the present invention. It should be appreciated, though; that the present invention is defined by the following claims construed in light of the prior art so modifications of the changes may be made to the exemplary embodiment of the present invention without departing from the inventive concepts contained therein.

The invention claimed is:

1. A manual article removal apparatus for use on a surface, comprising:
- (a) a blade forming a generally planar face, said blade including a first side and an opposing second side and a lengthwise axis;
- (b) a means for pivotal movement along a pivotal axis adjacent to said second side;
- (c) a primary extension having a primary longitudinal axis, said primary extension including a proximal end portion and a distal end portion, wherein said proximal end portion is rigidly attached to said second side;
- (d) a secondary extension having a secondary longitudinal axis, said secondary extension including a pivotal end portion and an opposing end portion, said pivotal end portion is attached to said means for pivotal movement, wherein said primary extension and said secondary extension each have independent diverging movement to one another and said proximal end portion longitudinal axis and said pivotal end portion secondary longitudinal axis both intersect at said pivotal axis; and
- (e) a means for urging said distal end portion toward said opposing end portion.

2. A manual article removal apparatus according to claim 1 wherein said pivotal end portion is pivotally affixed to said second side.

3. A manual article removal apparatus according to claim 1 wherein said means for urging is an elastomeric element.

4. A manual article removal apparatus according to claim 1 wherein said means for urging is a spring.

5. A manual article removal apparatus according to claim 1 wherein said primary extension and said secondary extension are sized and configured to be grasped by a user.

6. A manual article removal apparatus according to claim 5 wherein said distal end portion and said opposing end portion are sized and configured to be grasped by the user.

7. A manual article removal apparatus according to claim 1 wherein said primary extension is affixed to said second side at a positional orientation such that said primary longitudinal axis is at a substantially right angle to said lengthwise axis of said blade.

8. A manual article removal apparatus according to claim 7 wherein said primary longitudinal axis and said secondary longitudinal axis form an arc to one another of about zero (0) to one-hundred eighty (180) degrees originating at said pivotal axis.

9. A manual article removal apparatus according to claim 7 wherein said primary longitudinal axis and said secondary longitudinal axis from an arc to one another of about zero (0) to ninety (90) degrees originating at said pivotal axis.

10. A manual article removal apparatus according to claim 1 wherein said first side is substantially concave.

11. A manual article removal apparatus according to claim 1 wherein said first side is substantially flat.

12. A manual article removal apparatus according to claim 1 wherein said first side further includes a resilient element extension portion.

13. A manual article removal apparatus according to claim 1 wherein said first side further includes a bristle element extension portion.

14. A manual article removal apparatus according to claim 1 wherein said first side further includes a sponge element extension portion.

15. A manual article removal apparatus for use on a surface, comprising:
- (a) a blade forming a generally planar face, said blade including a first side and an opposing second side;
- (b) a means for pivotal movement along a pivotal axis adjacent to said second side;
- (c) a primary extension having a primary longitudinal axis, said primary extension including a proximal end portion and a distal end portion, wherein said proximal end portion is adjacent to said second side;
- (d) a secondary extension having a secondary longitudinal axis, said secondary extension including a pivotal end portion and an opposing end portion, said pivotal end portion is pivotally affixed to said means for pivotal movement;
- (e) an arc, formed by said primary longitudinal axis and said secondary longitudinal axis to one another, of about zero (0) to one-hundred eighty (180) degrees, wherein said arc originates at said pivotal axis; and
- (f) a means for urging said distal end portion toward said opposing end portion.

* * * * *